US012791315B2

(12) United States Patent
Youmans et al.

(10) Patent No.: US 12,791,315 B2

(45) Date of Patent: Nov. 10, 2026

(54) METHOD AND ALGORITHM FOR FLIGHT, MOVEMENT, AUTONOMY, IN GPS, COMMUNICATION, DEGRADED, DENIED, OBSTRUCTED NON OPTIMAL ENVIRONMENT

(71) Applicant: RHOMAN AEROSPACE CORPORATION, Pasadena, CA (US)

(72) Inventors: Thomas Andrew Youmans, Santa Monica, CA (US); Thomas Bradford Doermer Callen, Pasadena, CA (US)

(73) Assignee: RHOMAN AEROSPACE CORPORATION, Pasadena, CA (US)

( * ) Notice: Subject to any disclaimer, the term of this patent is extended or adjusted under 35 U.S.C. 154(b) by 0 days.

(21) Appl. No.: 18/523,180

(22) Filed: Nov. 29, 2023

(65) Prior Publication Data

US 2024/0092485 A1 Mar. 21, 2024

Related U.S. Application Data

(63) Continuation of application No. 16/845,667, filed on Apr. 10, 2020, now Pat. No. 11,866,167.

(Continued)

(51) Int. Cl.

*G01C 21/00* (2006.01)
*B64U 10/13* (2023.01)

(Continued)

(52) U.S. Cl.

CPC ........... *G01C 21/005* (2013.01); *G06V 10/44* (2022.01); *G06V 20/17* (2022.01); *G06V 20/176* (2022.01);

(Continued)

(58) Field of Classification Search

None

See application file for complete search history.

(56) References Cited

U.S. PATENT DOCUMENTS 8,577,518 B2 11/2013 Linden et al.
9,779,309 B1 10/2017 Fink et al.

(Continued)

FOREIGN PATENT DOCUMENTS

WO 2018/035508 A1 2/2018

OTHER PUBLICATIONS

Non-Final Office Action mailed Mar. 29, 2022, in U.S. Appl. No. 16/845,667 (24 pages).

(Continued)

*Primary Examiner* — Jennifer M Anda

(74) *Attorney, Agent, or Firm* — Smith, Gambrell & Russell, LLP

(57) ABSTRACT

A method for enhancing movement or autonomy, including movement or flight of vehicles or flight vehicles in communication and or GPS degraded and or denied and or non-optimal environments is presented, where 3D area maps and or area maps may be employed, and 3D area maps and or area maps employed may include embedded position, location or GPS date, where the location or GPS data may be used in the present invention to determine vehicle location through image recognition, and using the GPS coordinates or location from the 3D area map of the image recognized, or measuring distance to other know aspects of a 3D area map in the real world, and context or system level information may also be used to estimate obstacle shapes and optimal routes in a potential route of travel or for understanding an area.

14 Claims, 10 Drawing Sheets

Related U.S. Application Data

(60) Provisional application No. 62/831,804, filed on Apr. 10, 2019.

(51) Int. Cl.

| | |
|---|---|
| ***B64U 101/30*** | (2023.01) |
| ***G06V 10/44*** | (2022.01) |
| ***G06V 20/10*** | (2022.01) |
| ***G06V 20/17*** | (2022.01) |
| ***G06V 20/64*** | (2022.01) |

(52) U.S. Cl.
CPC .............. *G06V 20/64* (2022.01); *B64U 10/13* (2023.01); *B64U 2101/30* (2023.01); *B64U 2201/10* (2023.01)

(56) References Cited

U.S. PATENT DOCUMENTS

| | | | | |
|---|---|---|---|---|
| 10,466,069 | B1 | 11/2019 | Kirksey et al. | |
| 10,795,380 | B1 | 10/2020 | Patton et al. | |
| 11,074,447 | B1 | 7/2021 | Fox et al. | |
| 11,155,348 | B2 | 10/2021 | Kanji et al. | |
| 11,492,113 | B1 | 11/2022 | Kipurs et al. | |
| 11,565,807 | B1 | 1/2023 | Zuckerman | |
| 11,866,167 | B2 | 1/2024 | Youmans et al. | |
| 12,405,615 | B2 * | 9/2025 | Youmans | G01C 21/005 |
| 2008/0036652 | A1 | 2/2008 | Shore et al. | |
| 2011/0282575 | A1 | 11/2011 | Masuda et al. | |
| 2014/0267723 | A1 | 9/2014 | Davidson, Jr. et al. | |
| 2015/0036870 | A1 | 2/2015 | Mundhenk et al. | |
| 2015/0221079 | A1 * | 8/2015 | Schultz | G01S 7/4808 382/190 |
| 2015/0248783 | A1 | 9/2015 | Fayle | |
| 2015/0363717 | A1 | 12/2015 | Lim | |
| 2015/0370251 | A1 | 12/2015 | Siegel et al. | |
| 2016/0140851 | A1 | 5/2016 | Levy et al. | |
| 2016/0162809 | A1 | 6/2016 | Turner et al. | |
| 2016/0275801 | A1 | 9/2016 | Kopardekar | |
| 2016/0293018 | A1 | 10/2016 | Kim et al. | |
| 2016/0300386 | A1 | 10/2016 | Bostick et al. | |
| 2016/0350927 | A1 | 12/2016 | Ma | |
| 2016/0371985 | A1 | 12/2016 | Kotecha | |
| 2017/0102699 | A1 | 4/2017 | Anderson | |
| 2017/0301373 | A1 | 10/2017 | Tran et al. | |
| 2018/0012337 | A1 * | 1/2018 | Puetter | H04N 19/182 |
| 2018/0025044 | A1 | 1/2018 | Hostetter et al. | |
| 2018/0054604 | A1 | 2/2018 | Boyd et al. | |
| 2018/0094935 | A1 | 4/2018 | O'Brien et al. | |
| 2018/0096541 | A1 | 4/2018 | O'Brien et al. | |
| 2018/0136332 | A1 | 5/2018 | Barfield, Jr. et al. | |
| 2018/0239991 | A1 | 8/2018 | Weller et al. | |
| 2018/0249168 | A1 | 8/2018 | Loyd et al. | |
| 2018/0292214 | A1 * | 10/2018 | Zhang | G01C 21/005 |
| 2018/0292541 | A1 | 10/2018 | De Silva et al. | |
| 2018/0319495 | A1 | 11/2018 | Tu | |
| 2018/0349522 | A1 | 12/2018 | Aphek et al. | |
| 2019/0011934 | A1 | 1/2019 | DeBitetto et al. | |
| 2019/0043372 | A1 | 2/2019 | Winkle et al. | |
| 2019/0065951 | A1 | 2/2019 | Luo et al. | |
| 2019/0080142 | A1 * | 3/2019 | Abeywardena | G01C 21/3852 |
| 2019/0120928 | A1 | 4/2019 | O'Shea et al. | |
| 2019/0156081 | A1 | 5/2019 | Pous et al. | |
| 2019/0156640 | A1 | 5/2019 | Cutcher et al. | |
| 2019/0251352 | A1 | 8/2019 | Hovden et al. | |
| 2019/0265705 | A1 | 8/2019 | Zhang et al. | |
| 2019/0266297 | A1 | 8/2019 | Krause | |
| 2019/0293450 | A1 | 9/2019 | Hino et al. | |
| 2019/0333378 | A1 | 10/2019 | Iuzifovich et al. | |
| 2019/0368877 | A1 * | 12/2019 | O'Shea | G01S 13/89 |
| 2019/0385361 | A1 | 12/2019 | Siddiqui et al. | |
| 2020/0043348 | A1 | 2/2020 | Ghosh et al. | |
| 2020/0167650 | A1 * | 5/2020 | Lamy-Poirier | G06T 7/77 |
| 2020/0265247 | A1 | 8/2020 | Musk et al. | |
| 2020/0324898 | A1 | 10/2020 | Youmens et al. | |
| 2020/0329104 | A1 | 10/2020 | Narayanasamy et al. | |
| 2020/0388169 | A1 | 12/2020 | Barr et al. | |
| 2020/0401617 | A1 | 12/2020 | Spiegel et al. | |
| 2021/0019903 | A1 | 1/2021 | Gornik et al. | |
| 2021/0061465 | A1 | 3/2021 | Kaneda | |
| 2021/0099969 | A1 * | 4/2021 | Poscher | G01S 19/396 |
| 2021/0112311 | A1 | 4/2021 | Wilczynski et al. | |
| 2021/0112312 | A1 | 4/2021 | Wilczynski et al. | |
| 2021/0209331 | A1 | 7/2021 | Grant et al. | |
| 2021/0240206 | A1 | 8/2021 | Michini et al. | |
| 2021/0263166 | A1 | 8/2021 | Zheng et al. | |
| 2021/0302195 | A1 | 9/2021 | Miura | |
| 2021/0374836 | A1 | 12/2021 | Bronicki et al. | |
| 2022/0301192 | A1 | 9/2022 | Boardman et al. | |
| 2022/0390964 | A1 | 12/2022 | Youmans et al. | |
| 2023/0067774 | A1 | 3/2023 | Nishimoto | |
| 2023/0188941 | A1 | 6/2023 | Palop et al. | |

OTHER PUBLICATIONS

Final Office Action mailed Sep. 27, 2022, in U.S. Appl. No. 16/845,667 (44 pages).
Notice of Allowance and Fees Due and Interview Summary mailed Sep. 1, 2023, in U.S. Appl. No. 16/845,667 (14 pages).
Non-Final Office Action mailed Apr. 12, 2024, in U.S. Appl. No. 17/833,420 (15 pages).

* cited by examiner

METHOD AND ALGORITHM FOR FLIGHT, MOVEMENT, AUTONOMY, IN GPS, COMMUNICATION, DEGRADED, DENIED, OBSTRUCTED NON OPTIMAL ENVIRONMENT

CROSS-REFERENCE TO RELATED PATENT APPLICATION(S)

This patent application claims priority to U.S. provisional application 62/837,804 filed on Apr. 10, 2019, the contents of which are incorporated in their entirety herein. In accordance with 37 C.F.R. § 1.76, a claim of benefit is included in an Application Data Sheet filed concurrently herewith.

FIELD OF THE INVENTION

A methodology and algorithm for autonomous VTOL flight in communication degraded and GPS denied environments based on any combinations of one or more of geospatial intelligence, 3D Area Mapping, flight profile integration, spot-checks, applied statistics, and other measurements and calculations is presented and discussed. Variance in flight profile integration, error propagation, 3D Area Maps, and recommendations for implementation are presented. By loading 3D Area Maps into a multi-rotorcraft, integrating flight profiles and using distance sensors, visual spot checks and image classification, autonomous flight capabilities in degraded, denied, compromised, or otherwise non-optimal GPS and communication environments, including electromagnetically degraded, denied or otherwise non-optimal environments, can increase.

BACKGROUND OF THE INVENTION

Flight vehicles, drones, winged drones and multi-rotorcraft drones all typically rely on the Global Positioning System, or GPS, to determine their precise geo-spatial location during piloted and autonomous flight. The Global Positioning System is accomplished through a network of satellites where at least three satellites send a signal to a GPS receiver, and through triangulation, and the measurement of time it takes signals to reach a GPS receiver from each of the three satellites, a GPS position is determined. Knowing the exact state of a flight vehicle, especially an autonomous flight vehicle, is very important to allow the flight vehicle to follow a designated flight path. A state of a vehicle may include speed, direction, orientation, height above ground, and other information. GPS is generally one of the most essential pieces of information for a flight vehicle or autonomous flight vehicle to know its state, and therefore allow operations and the flight vehicle to fly as intended, and often, to stay stable and maintain safe flight. This is especially important for autonomous flight and autonomous operations.

In some cases, a GPS signal may not be reliable, received by the flight vehicle, continuous, or otherwise usable for a flight vehicle. Cases like this can occur in cities where tall buildings may block a satellite signal, in cases where an enemy blocks a GPS signal intentionally through electromagnetic interference or otherwise, in cases where an enemy sends a fake or 'spoofed' GPS signal, in cases where a vehicle flies in a cave, underground, or underwater, where a GPS signal is blocked, or other instances where a GPS signal may be blocked by obstacles or intentional interference, spotty from partial obstruction or week signals, or low or no power to a GPS receiver.

Various methods are being developed for to enable autonomy, and autonomous flight, as well as aids to crewed flight, in GPS degraded, denied, or otherwise non-optimal, areas. Some of these include visual tracking to stationary objects and detecting a relative change in position to that stationary object over time, including visual odometry and or SLAM, simultaneous localization area mapping, and other loop-closure and loop tacking methods.

A need arises for techniques that increase the capability for autonomy in GPS denied and communication degraded areas.

BRIEF SUMMARY OF THE INVENTION

The present invention provides techniques that increase the capability for autonomy in GPS denied and communication degraded areas. The present invention includes an algorithm, method, and steps for enhancing autonomous capabilities in communication degraded and or GPS degraded, denied and otherwise non-optimal areas or environments, where autonomous capabilities are enhanced through at least one of increased positioning knowledge, timing knowledge, decreased variance around positioning, increased information and knowledge about surrounding areas where vehicle operations or flight may occur. GPS and communication degraded and denied environments include any of denied, disrupted, degraded, non-optimal, potentially blocked by intention or buildings or otherwise, as well as underground tunnels, underwater, and other areas with electromagnetic interference.

The method, algorithm, steps, processes, of the present invention may be employed by a flight vehicle, drone, multi-rotorcraft, vertical take-off and landing flight (VTOL) flight vehicle, a flight vehicle, a vehicle, or a party, person or object, to aid in movement, autonomous movement, tracking, flight, wheeled or other autonomy or positioning needs.

The present invention prescribes that a flight vehicle may have an area map loaded onto it, where the area map may be a 3D area map with geo-tagged information, such that objects in the 3D area map are labeled with GPS coordinates, and a flight vehicle has onboard cameras with image recognition capabilities, where objects that the flight vehicle detects with its cameras or sensors while flying can be compared to the onboard 3D area map, such that the vehicle detects an object in its surroundings, then determines the analogous object in the 3D area map, then loads the tagged GPS coordinates for that object in the 3D area map as its current coordinates, and therefore knows its actual GPS position despite no GPS signal. The flight vehicle would detect its distance from and orientation to the object, and adjust the specific coordinates appropriately. Bayesian techniques may be employed.

Likewise, the present invention may include estimating the position of a flight vehicle by combining standard flight vehicle path integration with measurements to expected flight route edges, where based on a 3D area map of an area, or knowledge about an expected flight path through a tunnel, there is an expected width between the buildings or width of a tunnel, such that a flight vehicle integrates in flight path to estimate its location, then verifies, enhances, and or reduces the variance of the position estimate by measuring it's distance to the edges of the flight path where it is located, such that by combining its estimate of location through flight path integration with its estimated expected distance to edges of a flight path, it re-affirms its position estimate based on flight integration. Bayesian techniques may be employed.

Furthermore, the present invention may utilize contextual information about a possible flight area or flight area to calibrate positioning and position tracking systems, where known dimensions of objects in a flight area are used to calibrate distances, where onboard sensors detect on object for which specific size parameters are known, like the height of a street lamp or width of a sidewalk, and then by know exact dimensions of object in an area, visual based or other relative-distance-measurement systems employed locally on a flight vehicle reduce their positioning, localization and movement tracking variance. Bayesian techniques may be employed.

Within the present invention, the methodology may include using prior information about a flight area or possible flight area, along with censor output and or measurements taken from a flight vehicle, to make probable estimations about a flight area or possible flight area, to inform and guide autonomous flight route planning. For example, contextual information about an area may be aerial photos showing that more of the buildings are rectangular instead of triangular, and measurements taken by a flight vehicle may include the angles of the edges of buildings near to the flight vehicle as well as the lengths of the sides of some buildings, such that a flight vehicle may be able to autonomously estimate and determine a possible shortest route to a destination based on estimations of building sizes informed by prior information and using and updated with measurements taken by the flight vehicle. Bayesian techniques may be employed.

The present invention may include creating, augmenting, building and or using maps, area maps, 3D area maps, encoding macro-information into area maps including GPS coordinates and other information that enables positioning.

Specifically, Geo-tagging specific landmarks, objects, and or objects that can best be recognized by object detection algorithms such that the positioning information may be used by autonomous flight vehicles to determine positioning or location without a GPS signal. These methods include geo-tagged standard or 2D images in a database, where cameras or sensors on a vehicle scan its surroundings, and when they find an exact object of scene within real world that matches an image or scene or images or scenes in the database, it can infer its actual GPS position.

A 3D area map may include GPS or location information. A 3D area map may be loaded onto a vehicle, so that a vehicle may determine its location even in GPS degraded environment, by identifying where it is on the 3D area map, by using image recognition, distance sensors, IMU/INS, flight path integration. Multiple methods allow a vehicle to determine it's likely position without a 3D area map—and using that likely position, it is able to better use information in the 3D area map, and may incorporate Bayesian methods. Information about likely location may be null, zero or non-existent, a prior of no-information may be used, and it is still within the scope of the present invention.

Additionally, the present invention may include autonomous flight through areas with partial or zero prior mapping and or area knowledge.

By using image recognition to determine objects near a vehicle, and using distance measurements to known objects, or sizes of typical objects, known or discovered or seen in an area, information may help a vehicle navigate.

Area maps used may be 2D, and they may be flat 2D maps created from satellites, where imagery of the ground is geo-tagged, on-board cameras detect where the vehicle is within that geo-tagged 2D or 3D birds eye-view map of the terrain below.

In embodiments, there may be 3D area maps with encoding of geo-spatial information configured to enable positioning, localization, configured to enable positioning, localization with autonomous robotic systems.

A method of the present invention may include an apparatus that is a computing and or sensing package, that includes embedded software and or artificial intelligence and or machine learning and or data systems and or storage, such that a hardware package of the present invention includes all required sensors to sense and detect a surrounding environment, and to store 3D area maps and or area maps and or 2D dimensional birds-eye maps with geo-tagged information, and to perform calculations to sense and comprehend a surrounding environment, and identify a vehicle's expected location within an area map or 3D area map, and load the geo-locations of objects from the area map that the vehicles has sensed or detected in its surroundings, and this accomplish a method of the present invention, including any and or all of methods of the present invention.

In embodiments, the present invention may comprise an algorithm enhancing movement of a vehicle, including an algorithm configured to enhance movement in communication degraded or denied environments, including an algorithm configured to enhance movement in GPS degraded or denied environments, an algorithm configured to enhance movement in communication degraded or denied and GPS degraded or denied environments, an algorithm configured to enhance autonomy, an algorithm configured to enhance autonomy in communicate degraded and GPS denied environments, an algorithm configured to enhance autonomy in communicate degraded and GPS denied environments that employs a 3D area map, an algorithm configured to enhance autonomy in communicate degraded and GPS denied environments that employs a 3D area map loaded onto or accessible by a vehicle, an algorithm configured to enhance autonomy in communicate degraded and GPS denied environments that employs a 3D area map loaded onto or accessible by a vehicle where the vehicle is a flight vehicle, an algorithm configured to enhance autonomy in communicate degraded and GPS denied environments that employs a 3D area map where the map contains location data, an algorithm configured to enhance movement where a 3D area map is used and the map included location or GPS data, an algorithm configured to enhance movement where a 3D area map is used and the map included location or GPS data and a vehicle identifies objects using image recognition, and then loads the location or GPS of that image from the 3D area map and uses that identified location as the vehicles expected location, an algorithm configured where a vehicle has a flight area map, an algorithm where a vehicle has a flight area map and figures out where it is, based on in-situ detection, on the flight area map, and loads location information from that, an algorithm where a vehicle has a flight area map and identifies an object in the real world, that is in the flight area map, and loads the location information for that object to understand the location of the vehicle, an algorithm where a vehicle uses prior information to estimate flight paths, an algorithm where a vehicle uses prior information to estimate obstacles or items in an area, and or an algorithm where a vehicle uses prior information to estimate posterior distributions on objects in an area given in-situ measurements and flight area knowledge from a 3D area map.

In embodiments, a method of vehicle operation may comprise storing at least one area map encoded with geolocation information in a vehicle, using onboard sensors of the vehicle to sense a surrounding environment and detecting objects in the surrounding environment within the area map, and obtaining, at the vehicle, geo-location data from at least one area map of the detected objects in the surrounding environment and the using geo-location data information to estimate a geo-location of the vehicle.

In embodiments, the vehicle may be in an area with a denied, degraded, or otherwise lacking GPS signal. The vehicle may be autonomous. The vehicle may be a flight vehicle. The vehicle may be a flight vehicle that is a multi-rotorcraft.

In embodiments, an apparatus for a vehicle may comprise a computer system comprising a processor, memory accessible by the processor, and computer program instructions stored in the memory and executable by the processor, and configured to store at least one of area maps, images, geo-tagged area maps, and geo-tagged images, and configured to search the at least one of maps or images for specified objects and scenes, sensors configured to send obtain information about a surrounding environment of the vehicle to the computer system, and wherein the computer system is further configured detect objects and scenes in the surrounding environment from the sensor information, to compare the detected objects and scenes the surrounding environment to objects and scenes in the at least one of maps or images, and to load geo-tagged information about those objects and scenes that match.

In embodiments, the sensors may comprise visual cameras and the computer system is further configured for object detection. The sensors may comprise distance measuring sensors and the computer system is further configured to use distance point clouds. The computer system may be further configured to fuse image recognition with point cloud distance information. The computer system may be further configured to be modular so as to have a capability of adding features and capabilities that are configured to detect objects in a surrounding, compare them to information in area maps and or images, and output metadata of such objects or scenes detected as a capability enhancing output of such an apparatus. The vehicle may be a flight vehicle. The computer system may be further configured estimate flight routes. The computer system may be further configured direct the vehicle in flight routes. The computer system may be further configured direct a vehicle along flight routes by updating and or changing controls or control systems.

Likewise, additional capabilities may be covered by a modular add-on component, not described in the non-exhaustive list of embodiments of the present invention contained herein.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

Figure 1:
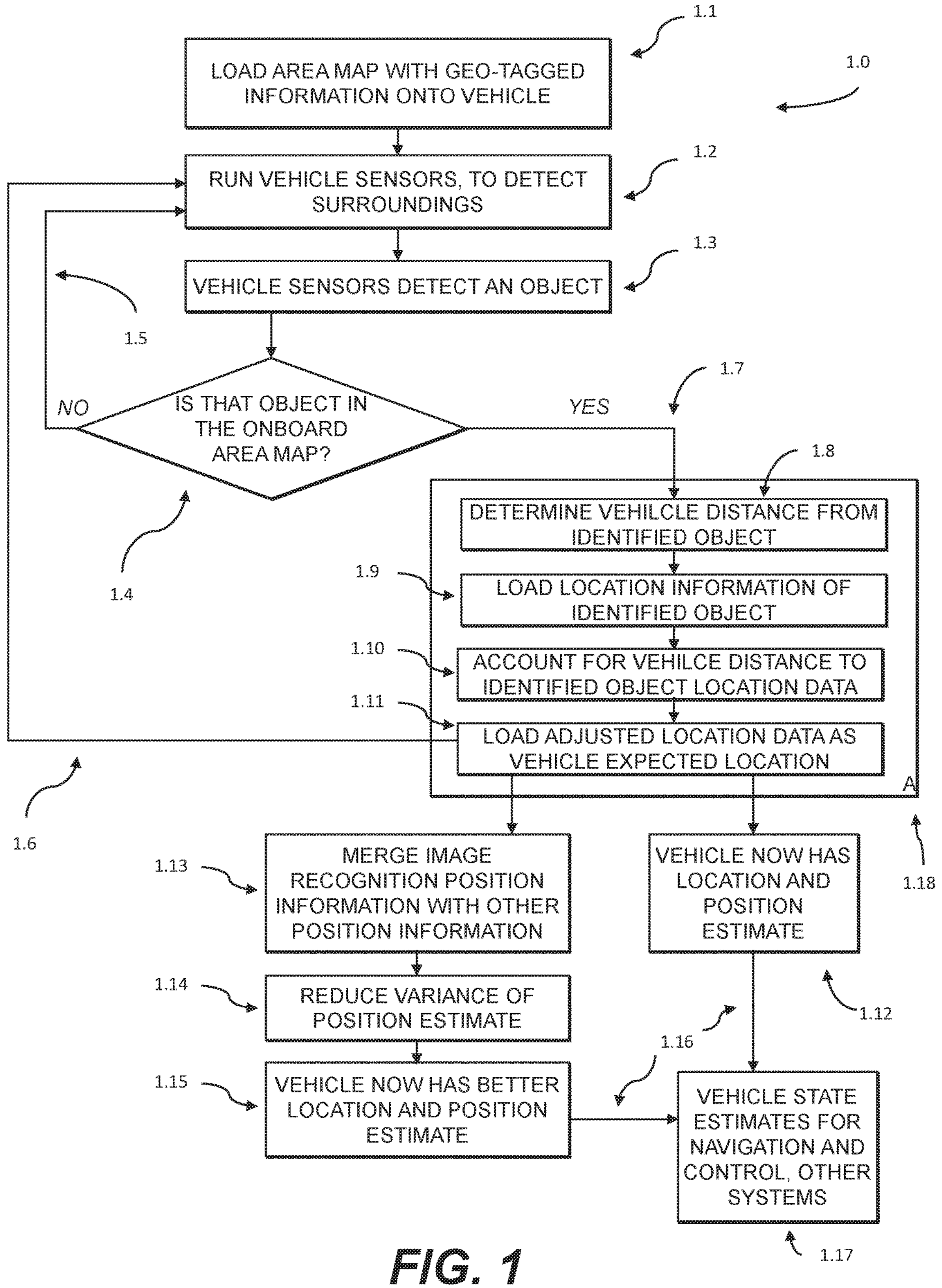
FIG. 1 shows a process for determining location using object recognition and area maps on a vehicle

The convergence of emerging technologies that are now standard practice in artificial intelligence and machine learning, with existing optical, spatial and dynamic flight sensors can enable increased autonomous capabilities including positioning, situational awareness, flight, navigation and or waypoint to waypoint movement or flight capability in communication degraded and GPS denied and degraded environments, through the novel application of the methods and algorithms of the present invention.

Combining developments in artificial intelligence and machine learning with emerging technologies and methods for 3D mapping and geospatial intelligence with existing, COTS optical, spatial and dynamic flight sensors, significant advancement of autonomous flight in communication degraded and GPS denied environments are made, with the present invention.

Increases in capabilities through the novel application of techniques, steps, process, order flow, and technologies as described in the present invention include enabling autonomous waypoint-to-waypoint flight in communication degraded and GPS denied environments, decreasing the effects of lapses in communication or breaks in GPS position monitoring data, allowing full capability autonomous robotic operations, autonomous flight, and even increased positioning knowledge for manned operations. GPS signals may be degraded in any terrain, including dense urban terrain, from the air and or at street level where GPS signal is week or fully blocked, as well as any other terrain or areas where GPS signal does not exist or is blocked or hindered, including mountainous areas, plains, forest, jungle, ocean, open areas, lakes, ice-cap areas, on Earth or around Mars or other planets where there is no global or planetary positioning system, underground or underwater where there is no signal, or otherwise.

Embodiments of the present techniques may be applied to any type of vehicle, such as any of a flight vehicle, a ground vehicle, a wheeled vehicle, a car, a tank, a multi-rotorcraft and or drone flight vehicle and or underwater vehicle, etc., and may be applied to any hardware and/or devices worn by or carried by a person, or any system which may use a GPS signal and/or coordinates. Additionally, in any case where a flight vehicle, drone, and/or vehicle and or multi-rotorcraft is mentioned in descriptions, as well as process descriptions and/or diagrams and/or flow charts, it is to be understood that the any of the above-described vehicles may be utilized.

Also employed in the present invention may be the utilization of maps, area maps, images, 3D area maps, and or other context and information about an area. The field of 3D area mapping through image based map reconstruction is burgeoning, thanks to increased computing power, advancing image-focused AI solutions, and technology modernization priorities pushing this topic forward.

Positioning is very important for robotic systems and autonomous robotic systems. Furthermore, positioning and or localization is very important for autonomous drones and multi-rotorcraft flight vehicles. Multi-rotorcraft control is dynamic, highly parameterized, and programmable—ideal for autonomous flight, and very dependent on accurate positioning and state-of-the-vehicle information. Typical control algorithms entail detecting a measured state, comparing that state to a desired state, and calculating the required adjustment based on the difference between current and desired state, that is, determine how much voltage to send to which engine in order to adjust the craft towards the desired state. The advancement (lower mass and lower cost) of measurement technologies (cameras with image recognition and calculations, LIDAR, others) continues to support autonomy in multi-rotors and robotic systems. Tilting a multi-rotorcraft moves it laterally, while changing the torque balance rotates the craft. Obstacles are avoided by detecting an obstacle, and enacting controls to maintain a min distance to any obstacles: voltage.to.each.motor.for.avoid← argmax{dist{flight.vect.est{voltage.adjust}, obstacle}}, specifically, the voltage sent to each motor in order to provide positional adjustments to a flight vehicle and or flight path adjustments to flight vehicle in a manner that those voltages sent to motors or thrust elements are such that they maximize a distance between a flight vehicle and or flight path and or expected flight path and an obstacle; noting that an obstacle may be a moving obstacle and or other vehicle; other methods fit within the scope of the present invention; sometimes a complete new flight path is calculated to avoid obstacles, and the present invention significantly aid in flight path estimation and creation through the increased information regarding a possible flight area enabled by the present invention.

3D area maps may be formed in many ways. 3D Area Map creation through merged images, in-situ measurements and remote measurements is a rapidly developing field, and is a US Army modernization priority. As these capabilities advance, they feed into autonomous flight in D3SOE areas, Although a 3D map formed in any manner can still accomplish the principles of the present invention.

In embodiments, images may be stitched together to create 3D area maps, with geo-tags and or geo-tagged elements and or location information, as well as data bases are created with images with location information and or meta data. 3D area maps may be created by stitching together 2D images, such that image edges are detected, and compared with image edges of other images such that they can be aligned and connected, where artificial intelligence systems and or object recognition may be used to determine image edges and or which images go next to each other. Additionally, syncing ground based and or street view level imaged with aerial and or satellite images using similar methods, as well as transformation functions with images of different sizes and or with different properties is a method of accomplishing, a method of the present invention. Images may come from any source with images and location information and or other relevant information, including Google Earth, Google Maps, Google Street View, One World Terrain Data, and or other sources. Additionally, databases of images may come from those sources and or other sources, where if images from Google Street View or elsewhere were taken with fish-eye camera lenses, or otherwise camera lenses different than those used on nearby photos, and or that distort any image in any way, transformation functions may be used on images to ensure all images in a database have certain constant parameters.

2D images taken from many angles can be stitched together to create precise building or area geometries. In some cases, 2D images can be taken from a ground controlled UAV, common in architecture and reconstructing diagrams of historic ruins. Remote sensed data, including satellite imagery, and photographs taken from remote ground based locations can also be used. Embedding GPS coordinates within spatial geometry reconstruction enables 3D Area Maps that aid in autonomous flight in GPS denied environments.

Merging 3D area maps and or 3D GPS or position marking encoded 3D area maps augments existing autonomous flight and autonomous flight in GPS denied and communication degraded areas in many ways, including many areas of overlap and combinations of increasing value.

Likewise, images taken from the ground, locally, or in-situ, may be used to calibrate or fill in different pieces of information for an area map or 3D area map created from remote imaging and or remote sensing.

Specifically, creating a 3D map of the planned flight area through remote sensing and image-based 3D environment reconstruction, encoding this map into a multi-rotorcraft flight vehicle, determining flight vehicle position estimates using flight profile integration of on-board COTS accelerometers and gyroscopes combined with optical image spot-checks during flight, waypoints can be pre-set and autonomously navigated by a multi-rotorcraft in communication degraded environments.

Incorporating measurement variance in remote-sensed 3D environment reconstruction and error propagation during flight profile integration is a key step to the proposed methodology. Furthermore, incomplete or imperfect 3D environment mapping may occur and autonomous flight control algorithms must maintain contextual awareness despite inaccuracies and missing information. LiDAR sensors may be implemented for highly accurate distance measurements during flight; complete functionality using only optical sensors is also necessary.

Appropriate techniques for 3-dimensional environment imputation through object recognition, surrounding feature characteristics and in-situ distance measurements enable the flight vehicle to populate missing pieces of the spatial map and maintain contextual awareness. Spatial imputation detail may be increased by incorporating Bayesian Analysis based on expected features updated with in-situ measurements, layered atop Categorical Analysis used during image classification.

Current obstacle avoidance techniques will support autonomous flight in communication degraded environments, but environment area mapping, updates to pre-loaded maps through the methods of the present invention, and flight profile integration are key to enable flight to predetermined locations on the environment maps, and for return-to-launch point and waypoint navigation capabilities, and novel as described in the present invention.

In any instance where 3D area maps may be used, or object recognition and or image recognition, visual based cameras and object recognition may be used, may be through AI methods, but also, distance sensors and area distance point clouds may be used, and other sensors and or distance and or any other object signature or determining methods, may be used.

Additionally, spotty, blocked, degraded and or denied GPS may come from intentional spoofing or signal faking, blockage by structures or electromagnetic wave interference, such as flying by powerlines, may be due to slow signal-lock from GPS satellites, and specifically, any instance where GPS signal is not ideal, or information from GPS signal or system is not accurate, correct, usable, trustworthy, or otherwise. Additionally, area maps used may 2D, and that they may be flat 2D maps created from satellites, where imagery of the ground is geo-tagged, on-board cameras detect where the vehicle is within that geo-tagged 2D or 3D birds eye-view map of the terrain below.

In an embodiment of the present invention, a flight vehicle may use a running GPS estimate, along with visually identifying elements in its area, such that, if records its current GPS location and its expected flight trajectory, where if it encounters a short loss of GPS, it will recognize it has lost its GPS signal, and when this is the case, it will begin to use the running estimate of GPS position, such that it can maintain current operations and flight plan and flight path until it recovers GPS signal, or switches fully to using other methods of the present invention. For example, if a flight vehicle flies near power lines, and suddenly loses its GPS signal, without the running tally of GPS signal, and or other methods of the present invention, even if it only loses GPS for a short minute or a few seconds, it may cause the flight vehicle to dis-orient from reality but no be aware that it is no longer where it thinks it is, and so it may lose elevation, or otherwise crash or fly not where it is intended—whereas with the present invention, it can maintain its positioning and continue on its intended flight route. Current methods use distance measuring devices on drones, where the drone takes a distance measurement of the area around it, often using LIDAR, then moves a short distance, and takes another distance measurement of the area around it—and then 'closes the loop'—which means it determines, through various mathematical methods, that the distance measurements of the surrounding area sync up with the distance measurement taken of the surrounding area before the drone moved a little bit, relative to that movement of the drone.

Sometimes a drone will take distance measurements of the surrounding area at step n, move a little bit, take distance measurements of the surrounding area, move a little bit, take distance measurements of the surrounding area, then compare the distance measurements to the surrounding area at stop number 3, or n+m where m is greater than 1, not only at n+1, and thus 'skip intervals' or 'skip steps' when closing the loop, in order to reduce computation time, when it is aware, based on various factors, that it doesn't need to close the loop at every step, so to speak.

Sometimes when mapping an interior area, or an area, without GPS or communication, a drone will travel along a route that ends and the starting points, but is not an exact retrace of the same route, but some sort of loop or circle or irregular polygon or any shape where the drone returns to its starting point, and may then take a distance measurement of the surrounding area, and may compare that to the distance measurements it took at the start of the journey, to determine that it is in its starting point, and this may also be considered 'closing the loop'.

The present invention is distinctly different than closing the loop methodology, in that closing the loop methodology is designed to help a drone maintain its orientation relative to an initial starting point, by constantly tracking measurements of the surrounding area, and monitoring that those changes in distances to the surrounding area are congruent with the change in position of the drone between measurements of the surrounding area—whereas in at least one embodiment of the present invention, it uses a pre-loaded map of an area, and identifies objects in the world while it is flying or moving, and looks for those specific known objects within the pre-loaded area map, and when it finds the specific object, it loads the GPS coordinates or positioning meta-data of that object in the area map as the current GPS position, or otherwise positioning, of the flight vehicle. Specifically, and furthermore, the present invention does not require consistently measuring distances of the surrounding area at many time steps and continuously or support positioning only relative to a starting point; an embodiment of the present invention determines absolute location, by loading that from the geo-tagged, or otherwise position tagged, area map, and it also works at any random point or time interval during flight, and is not required to be a consistently measured item. Some key differences between the present invention and closed loop, or closing the loop, methods are discussed, multiple other distinct differences exist.

Within the present invention, combining information may be accomplished using a Bayesian framework, where information may form a prior distribution around a position or location estimate, in that using some information, a first or preliminary estimate may be made, and then with the addition of additional information, including for example the recognition of a known object or distances to flight area path edges, that information may be included in such that it forms or informs or collapses or creates a posterior distribution. A posterior distribution may have a smaller or less or lower variance than a prior distribution. It is know that when a term of Bayesian framework is used in the present invention, it may mean any distribution or method in which an estimate with variance may be made or used, and with the inclusion of additional information, that variance may be reduced, or updated, as well as the estimate may be updated or changed.

In another embodiment of the present invention, a 3D area map or 2D area map is not used, but a data set of photographs of an area, region, city, any area, etc.—is used. In this case, a dataset of many photographs of an area is compiled, where each photograph is tagged with geo-coordinates or location or position of where the image was taken from, and sensors on the drone scan the surround area for objects that are in the photos in the database, and or scenes of images in the database, whereby if the drone determines that its sensors are seeing an exact object that is in one of the photos in the database, it can know its location, by using the image that contains the object it has detected, and it loads the position coordinates of that image, from where it was taken, and then determines a difference between location from where it saw the object and the size, positioning, difference of where the image of the object was taken, and so adjusts its expected position from that of where the image was taken, slightly.

Additionally, this method would work without identifying, specifically, on object in an image in the database, but by identifying a scene of an image, that is, by comparing a field of view of a camera for example, and determining that it is a same field of view, or scene or image-scape or overall content of an image in the database, the system can determine it is seeing the same thing as is shown in that image, and it may then determine that is in a location similar to where that image was taken, and this infer its location.

Additionally, a method of the present invention where an image database is used may be used in a Bayesian manner, using an initial estimate of a vehicles location, combined with detecting certain objects or images from a database can significantly reduce positional variance through applications of tactics involving Bayesian manners as elsewhere described in the present invention.

Comparing what a camera sees with images in an image database, and thus determining that a drone is near to where that image was taken can serve as a visual spot check, without any maps on board, as a method of the present invention.

Position and timing are often highly intertwined within autonomous systems, and by informing positioning without GPS through methods of the present invention, an embodiment of the present invention enables timing solutions and or informing or providing timing to a vehicle despite spotty, denied, degraded or otherwise non-optimal GPS and or signal and or timing and or communication environments.

Specifically, accurate time keeping is very important for autonomous systems, and often is calculated onboard using timing chips, and is also received from GPS signals. When a GPS signal is blocked, denied and or degraded, precise timing information may not be available. The methods of the present invention also reduce timing variance; as a vehicle flies, it is able to make estimates about its speed through on board sensors, and it often also may use GPS tracking to also inform speed, as well as timing, when GPS is not available, as per an embodiment of the present invention, a flight vehicle may know its coordinates through the present invention at one location at time p, then it may travel or move, and have estimates of its speed through on board sensors, then despite no GPS signal, it may determine its location including coordinates through a method of the present invention after traveling or moving, and at this time, time p plus k, it may again determine its location and or coordinates through a method of the present invention, and by knowing its new location, it can verify the measured speed from the onboard sensors, and by having a better estimate of the speed at which it traveled, combined with the locations of its starting point and ending point, it may thusly determine a more precise estimate for timing and or the time that has passes since traveling or moving, between time p and p plus k, where p and k may be variables representing time.

A methodology for autonomous VTOL flight in communication degraded environments based on 3D mapping and geospatial intelligence with flight profile integration and spot-checks is presented and discussed, 3D environmental map variance and flight profile integration error propagation in relation to flight dynamics is analyzed, and recommendations and tools for implementation are presented. Some of the many ways in which the present invention combines pieces of information are presented.

FIG. 1 shows a process for determining position or location in a GPS denied or degraded environment using area maps with geo-tagging and positional information within an area map on a vehicle. An area map or flight area map is loaded onto a vehicle 1.1 or otherwise accessible by a vehicle, then during flight, sensors on the vehicle run to detect the surroundings 1.2, where the sensors are looking for objects or scenes that are identifiable 1.3 and if the sensors detect objects and scenes constantly, and check to see of an object or scene is present in the area map 1.4, where is an object or scene is not present or detectable in an onboard area map, the sensors keep scanning 1.5, and if an object or scene is detected that is identifiable in the onboard map 1.7, the system determines the distance between the vehicle and the detected object or scene 1.8, loads the location information from the area map with location information tags or information 1.9, accounts for the distance of the vehicle to the detected object 1.10, and loads the location data which represents the location of the vehicle as it has been adjusted for the distance from the object to the vehicle 1.11, which is then used as an updated position estimate for the vehicle 1.12, and the information is also merged with other position estimates for the vehicle 1.13, which reduces variance of the estimate of the position of the vehicle 1.14, leading to better position estimates 1.15 which may be accomplished in a Bayesian manner as per the present invention, or other methods, and the updated position estimate and lower variance around that estimate feed into 1.16 the state of the vehicle and or other components or systems 1.17 to enable navigation and or control and or other systems and or components of a vehicle, autonomous robotic system of mission. Any of the steps in process A 1.18 may be accomplished in any order or simultaneously. Whether or not objects or scenes detected are in the area map, sensors constantly keep scanning 1.6.

Figure 2:
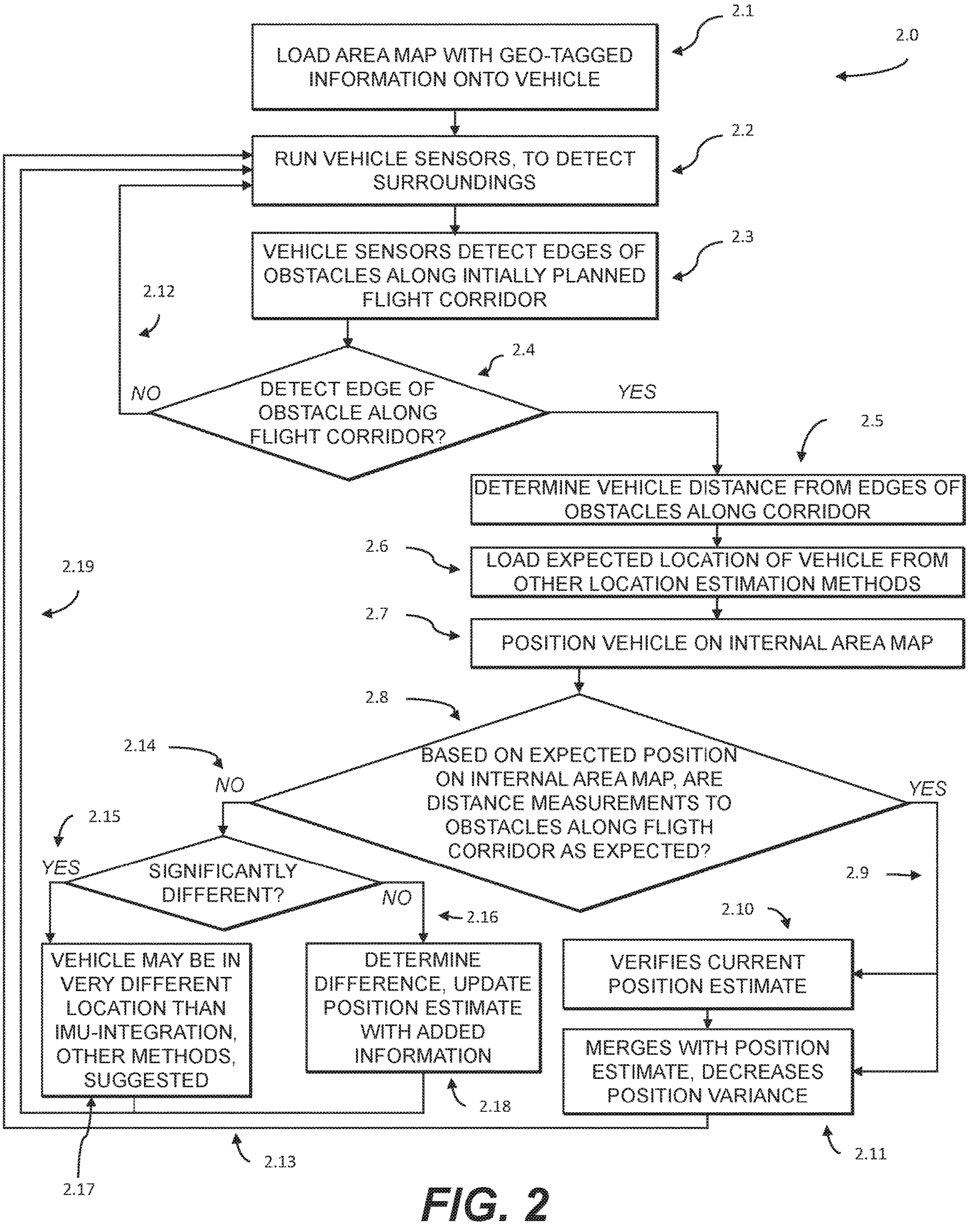
FIG. 2 shows a process for determining location using an area map loaded onto a flight vehicle and measuring distances to obstacles along the edges of a flight route

FIG. 2 shows a process for determining location using an area map loaded onto a flight vehicle and measuring distances to obstacles along the edges of a flight route. An area map or flight area map is loaded onto a vehicle 2.1 including any map or information characterizing a planned flight path including flight routes with obstacles around the expected flight path, or otherwise accessible by a vehicle, then during flight, sensors on the vehicle run to detect the surroundings 2.2 where the sensors detect a distance to obstacles along the edges of flight route or flight corridor 2.3, where if sensors do not detect obstacles near the edge of a flight route or corridor they keep scanning 2.12, noting that even if they do, they would continuously be scanning 2.13.

If an edge of an obstacle is detected along an edge of a flight route or corridor 2.4, a distance is determined from an obstacle along an edge of a flight path or corridor 2.5 where a flight path or corridor may be any movement path or corridor, including a street with wheeled or otherwise vehicles, and the estimated location of the vehicle from other estimates is loaded 2.6 and the estimated location is positioned on an internal area map or map or flight corridor map or information 2.7, and a comparison is made, where based on an expected location of a vehicle, and the planned flight route or travel route, distance measurements to obstacles on an edge of a flight route are compared to expected distances to objects on an edge of a flight route 2.8, and if the distances are as expected 2.9 then a position or location estimate is verified 2.10 and position information is merged with existing location information 2.11 to provide a more accurate estimate with lower variance. If the distance measurements do not align with expected measurements 2.14, then it is compared if they are significantly different 2.15, in which case a vehicle may be in a very different location than expected 2.17, or otherwise some analysis must be performed to understand the disconnect, or only slightly or somewhat different 2.16 in which case a position estimate may be updated with the updated position information, which may come from a synthesis of location information 2.18, in either case, sensors continue to test for obstacles along the edges of flight paths to check the distance and repeat the process 2.19.

Figure 3:
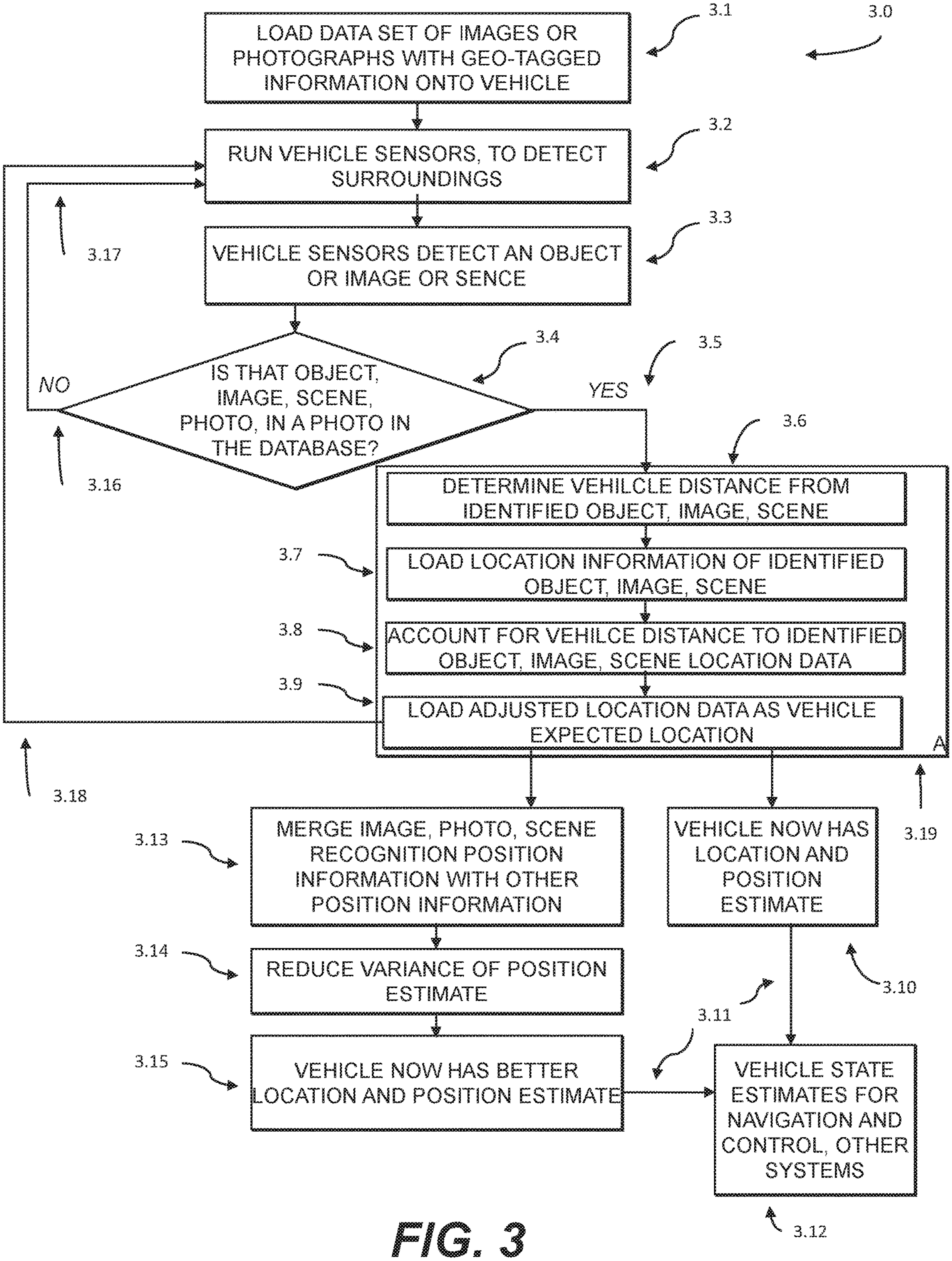
FIG. 3 shows a process for determining location using a database of images with geo or location information and observing objects or scenes from those images with sensors on a vehicle

FIG. 3 shows a process for determining location using a database of images with geo or location information and observing objects or scenes from those images with sensors on a vehicle. A database of images is loaded onto a vehicle 3.1 where the images have geo-tags or location tags, vehicle sensors run and detect the surrounding area 3.2, where these sensors may detect objects or scenes, or overall views from within the images in the database 3.3, scenes and or objects detected are compared with scenes and or objects in the database and or images in the database 3.4, where if a scene and or object is recognized 3.5, then a distance from the vehicle to the object, scene is determined 3.6, information about the location of the object, scene, is loaded 3.7, the distance from the vehicle to the object, scene, is accounted for 3.8, and the location or geo-location tagged with the image, and accounting for distance from the vehicle to an object in the image, scene, is determined and used and loaded as an expected position of the flight vehicle 3.9 noting that an image in the database may be location tagged with where a photo was taken from, such that this is also accounted for when determining distance from an object or scene, to a flight vehicle, including orientation of flight vehicle with object or scene, and relative to location and corresponding coordinates from where an image was taken, and then a vehicle has a better position estimate 3.10, which is passed 3.11 to a vehicle, state estimate, other sensors, systems, navigation, GPS estimate, etc. 3.12, and also, location estimation from identified object, scene, is merged with other location information, perhaps from classic methods, but also from any methods 3.13 which reduces variance in the location estimate 3.14 and provide a better location estimate with lower variance 3.15.

If objects, scenes, from the surroundings are not detected as being in images in the database or in database 3.16, scanning continues 3.17, noting that if an object or scene is detected, scanning still continues 3.18. Any of the steps in process A 3.19 may be accomplished in any order or simultaneously.

Figure 4:
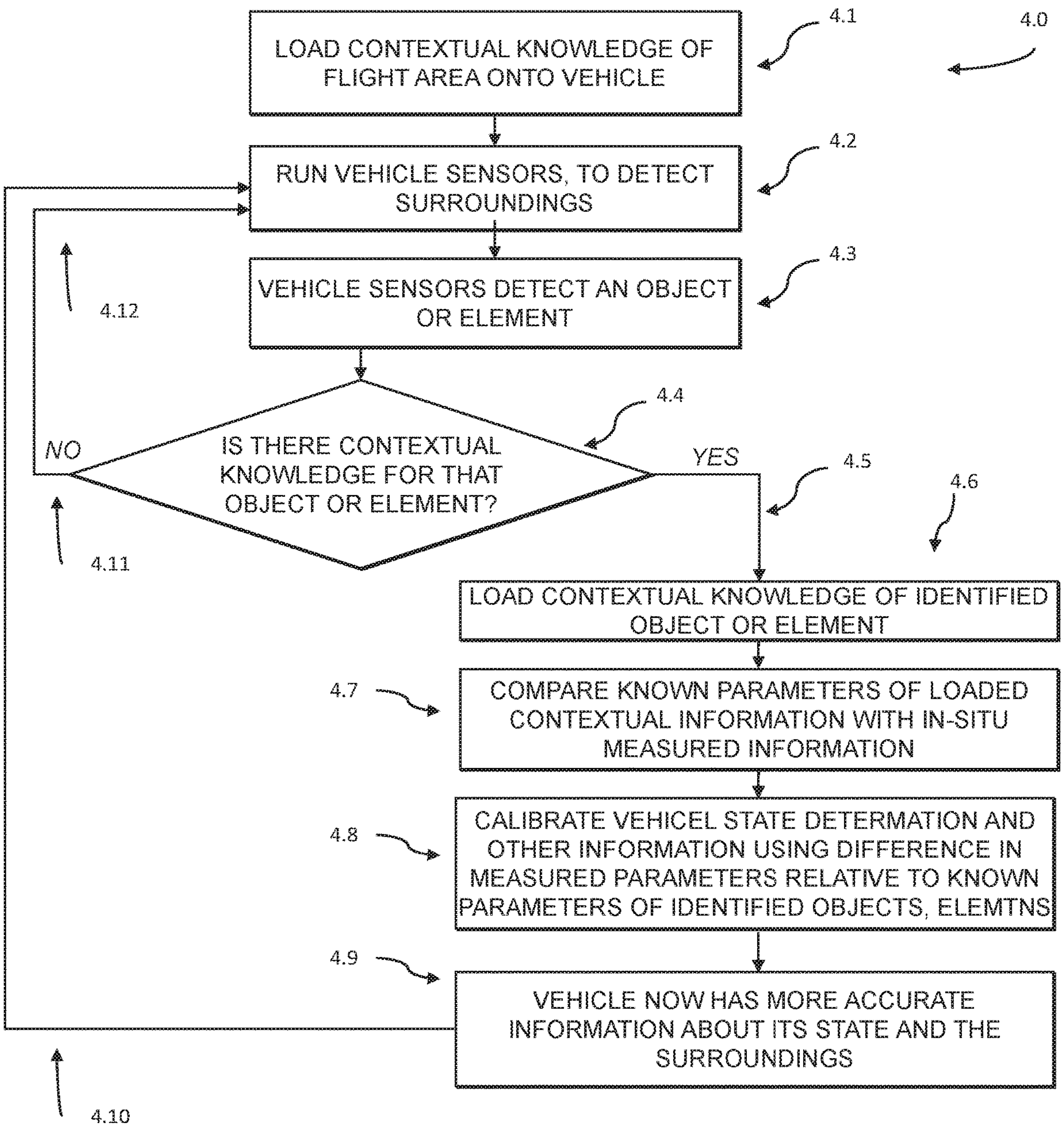
FIG. 4 shows a process where contextual knowledge or background knowledge supports autonomous flight through calibration of measurements

FIG. 4 shows a process where contextual knowledge or background knowledge supports autonomous flight through calibration of measurements. Contextual or background knowledge is loaded onto a vehicle 4.1, for example, standard height of street lamps or villager hut door heights, vehicle sensors run to detect surroundings 4.2, on object or element may be detected by the sensors 4.3, and the vehicle determines if there is background and or contextual information about a given object or element 4.4 and if so 4.5, that contextual information is loaded 4.6, at which points measurements related to that object are compared to known contextual information about that object 4.7, at which calibration can occur for parameters, estimates, or other aspects of the state of the vehicle and or the system and or the surroundings, or any parameter or variable or system that can be calibrated, including distances and or speed and or timing 4.8, allowing the vehicle to have increased knowledge about its surroundings 4.9, at which point a vehicle continues to repeat the process. If a vehicle determines that there is no background or contextual information for an object or element 4.11 it continues to run and scan surroundings. Noting, if elements do have contextual information, and background information is loaded, the process continues to run 4.12.

Figure 5A:
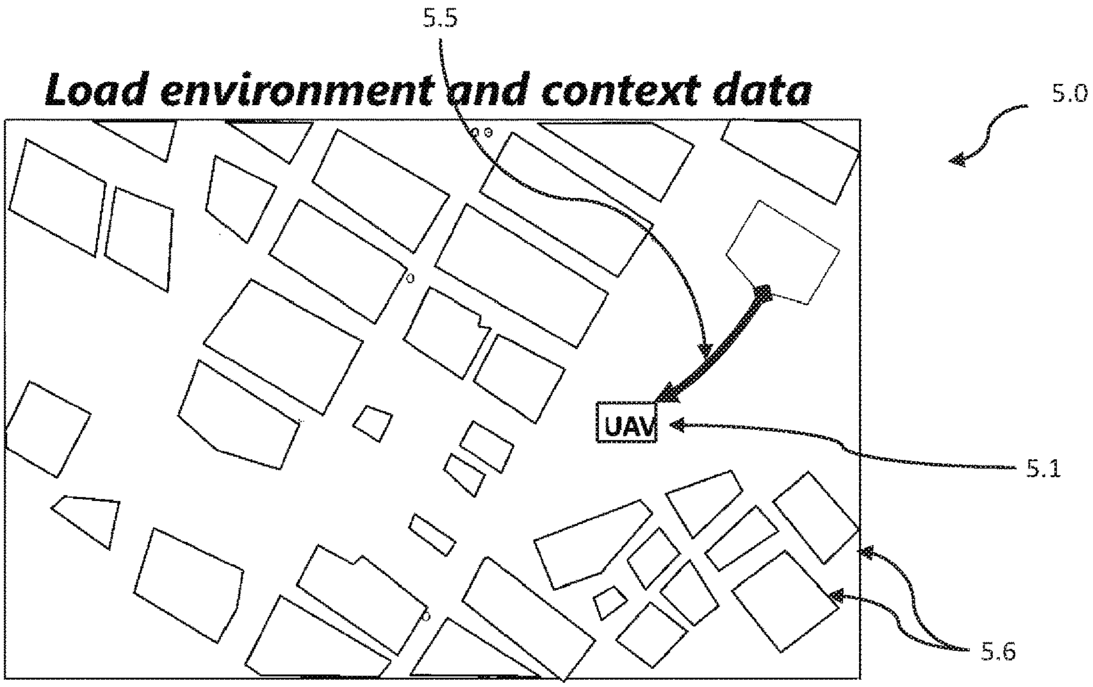
FIG. 5A shows a flight vehicle flying a flight path between buildings from a birds eye view, in a GPS degraded or denied area.
Figure 5B:
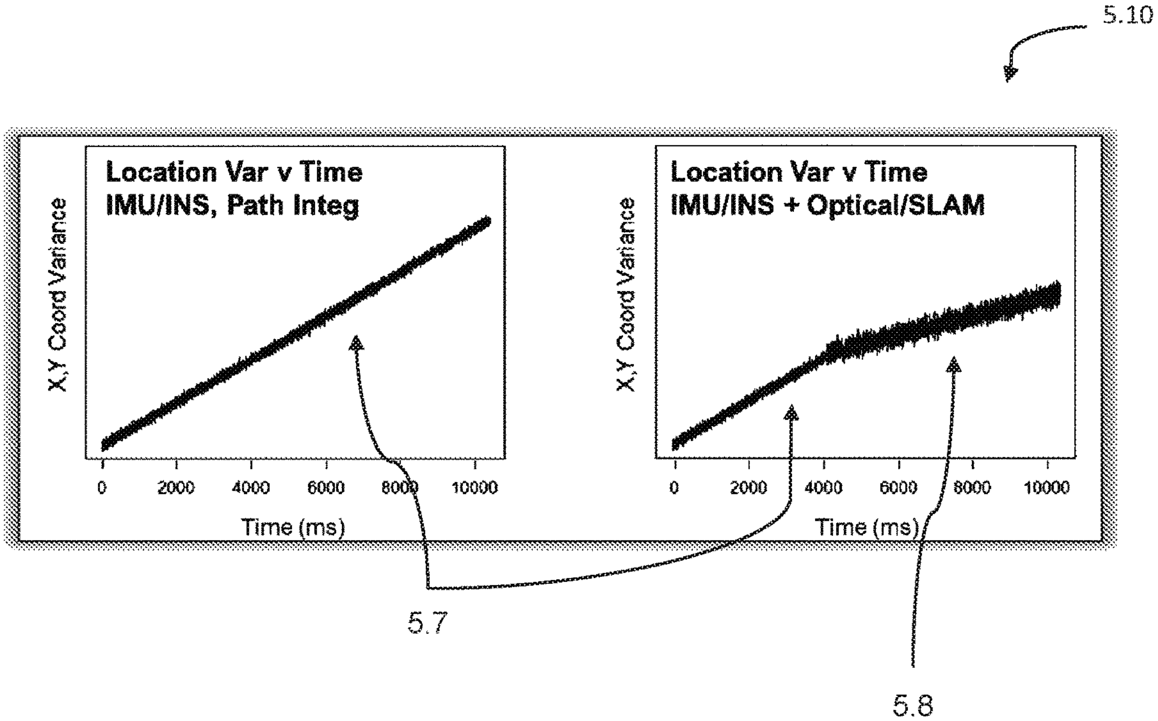
FIG. 5B shows the increasing positional variance, or the increasing variance around the expected position of the flight vehicle, versus time as it flies.

FIG. 5A and FIG. 5B show an example of location estimate variance using a classic method and also shows an example of location estimate variance using a more advanced and better but still classic method FIG. 5A shows a birds eye view map 5.0 with a flight vehicle 5.1 flying a flight path 5.5 between buildings 5.6, in a GPS degraded or denied area.

FIG. 5B shows the increasing positional variance 5.10, or the increasing variance around the expected position of the flight vehicle, versus time as it flies 5.7 and 5.8 where standard methods including flight path 5.5 integration lead to continuously increasing variance around expected position 5.7 due to IMU drift, and other classic methods may work better than only using flight path integration, VO/SLAM for example, but using VO/SLAM still does not fully reduce variance 5.8 around positioning or location estimates.

Figure 6A:
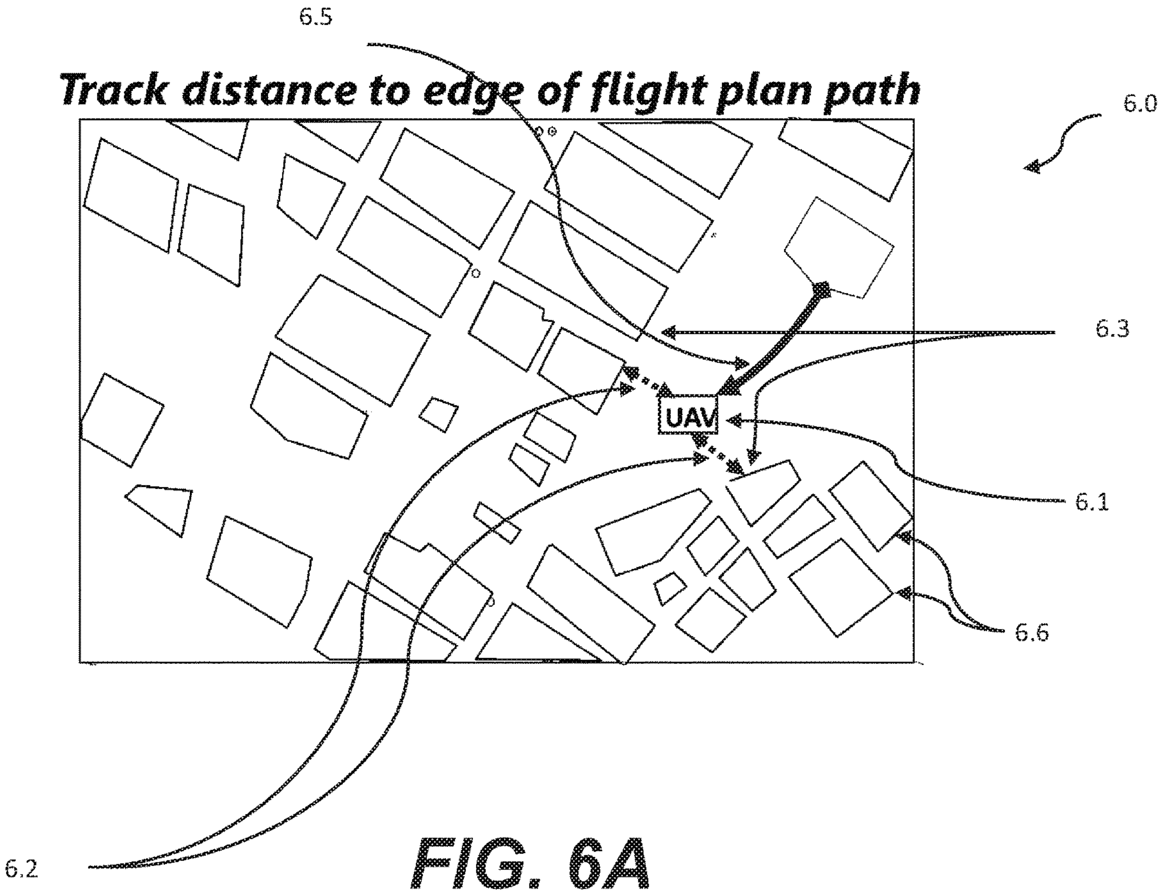
FIG. 6A shows a birds eye view of a method of the present invention, where a vehicle measures its distance to the edges of the open area of an intended flight path.
Figure 6B:
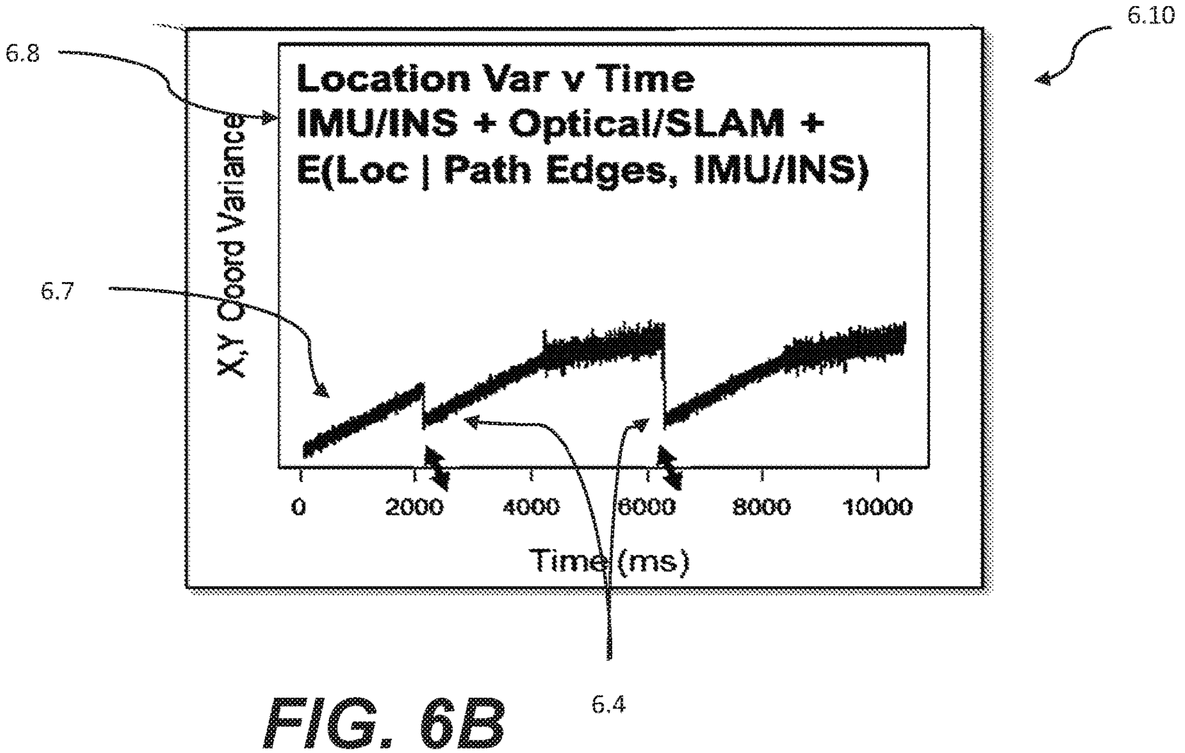
FIG. 6B shows a representation of a measurement of positional variance of a flight vehicle over time where it employs a method of the present invention and positional variance is decreased.

FIG. 6A and FIG. 6B show a piece of the present invention, where the algorithm, methodology, dictate that a vehicle measure a distance to a potential planned flight or movement path, whereby detecting a distance to borders of a known or expected path, with embedded location information, a location of a vehicle or flight vehicle is better known FIG. 6A shows a birds eye view 6.0 of a method of the present invention, where a vehicle 6.1 measures its distance 6.2 to the edges of the open area of an intended flight path 6.3, where the flight path 6.5 is in between various buildings 6.6 and is integrated to provide an estimate of the position of a vehicle, and then the distance measurements to the edge of a flight path area 6.2 are used, possibly in a Bayesian manner, to reduce the variance of the position estimate using the flight path 6.5 integration, possibly along with other classic position estimation methods inkling VO and SLAM.

FIG. 6B shows a representation 6.10 of a measurement of positional variance of a flight vehicle over time, while it flies along its flight route 6.5 between buildings 6.6 in a GPS degraded or denied area, where it employs a method of the present invention, by measuring its distance 6.2 to the edges of the open flight path area 6.3 of a planned flight route, where the position variance is shown to increase over time 6.7 using standard methods, but using a method of the present invention, positional variance is decreased 6.4.

In FIG. 6A and FIG. 6B, a method is shown where a drone reduces positional variance by measuring its distance 6.2 to the edges of a flight path 6.3, merging that information with positioning information from flight vehicle path integration, and thereby reducing positional variance. Specifically, if a flight vehicle has an internal digital, or otherwise, map of a flight area, and it has integrated its flight path to have an estimate for its current location, including its current location within the digital map of the flight area, and it can measure its distance to the edges of open area of the flight path it was planned to take, if those measurements are as expected, given its expected location on its internal flight area map, it is able to verify the position estimate made by integrating its flight path, and significantly reduce positional variance 6.4 on FIG. 6B.

This may be accomplished using a Bayesian framework, where its estimate location may be described or as E(Loc|Distance to Path Edges, Flight Path Integration) as shown in the label 6.8, whereas without the present invention, its position estimate would be described as E(Loc|Flight Path Integration, other classic methods), which has a higher variance 5.7, as shown in FIG. 5B, and even including other current methods, including visual odometry and or simultaneous localization area mapping, SLAM, or other loop closure methods, it would still have a higher position variance as shown in 6.7, but that positional variance decreases, as at 6.4. Multiple type of sensors, including distance measuring sensors as well as optical sensors with distance measuring or inferring or calculating capabilities may accomplish the measurement of distance to intended flight path area determinations 6.2. Current methods as also called classical methods, may include IMUs, INSs, various gyroscopes or inertial measurement sensors, VO, SLAM, and or any combination of any of these or other current techniques.

Within the context of the distance to flight route area edges 6.2, flight path 6.5 integration provides a Prior for current location probability estimation, where distance to flight path border informs, collapses, a posterior distribution for location or position estimate, in a case where a Bayesian framework may be used.

Figure 7A:
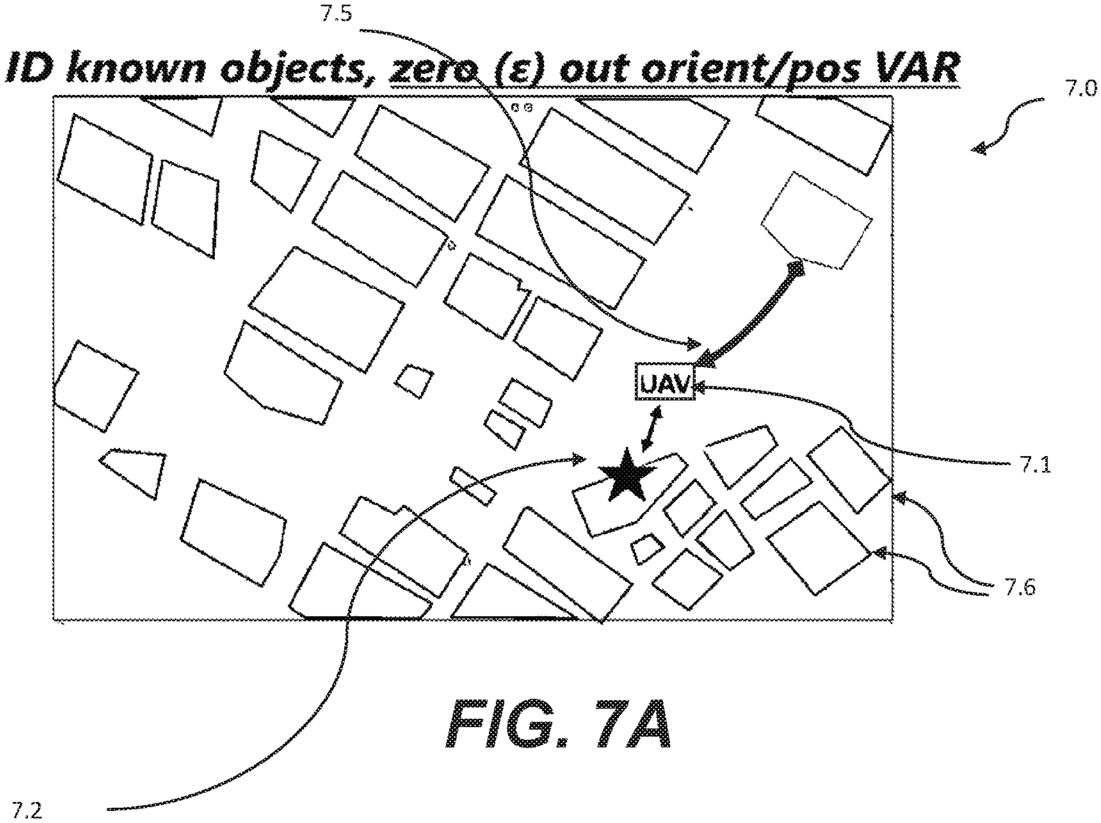
FIG. 7A shows a birds eye view of a method of the present invention where a vehicle has an area map loaded onto it and the vehicle flies between various buildings.
Figure 7B:
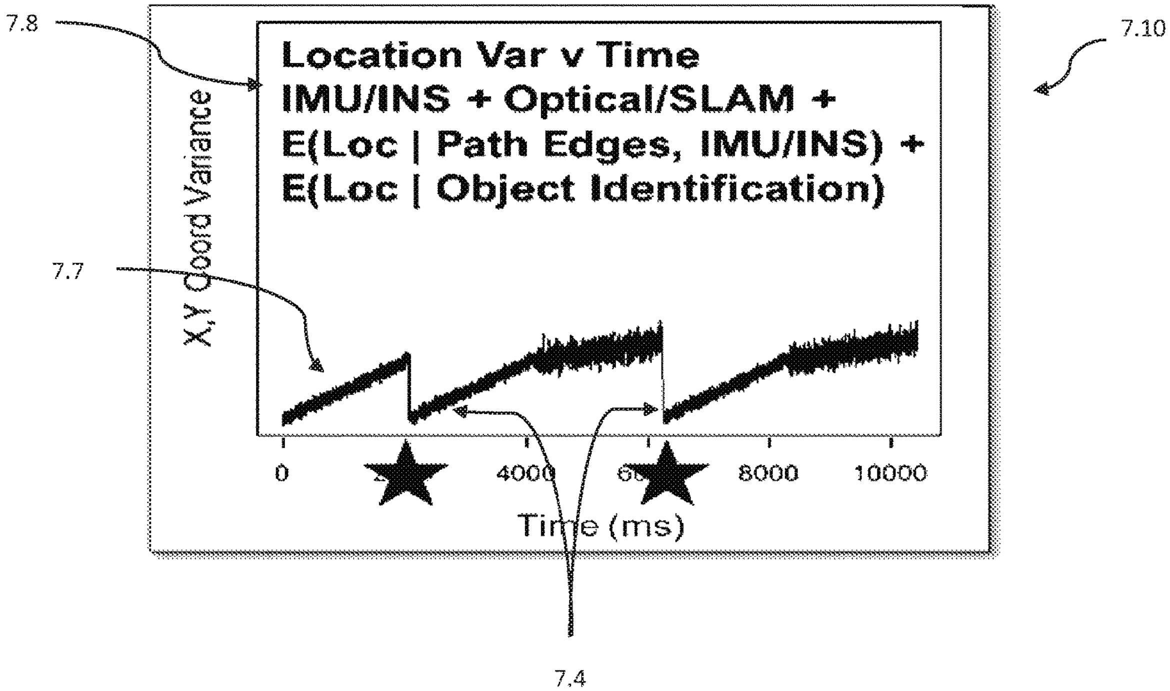
FIG. 7B shows a representation of a measurement of positional variance of a flight vehicle over time where it employs a method of the present invention by detecting objects that it recognizes in its onboard area map and positional variance is decreased.

FIG. 7A and FIG. 7B show a piece of the present invention, where the algorithm, methodology, dictate that a vehicle identify any objects recognizable as in a 3D flight area map, and given location information of those or that object, and the detected distance from a vehicle or flight vehicle to determine a location of a vehicle or flight vehicle more accurately than current methods FIG. 7A shows a birds eye view 7.0 of a method of the present invention, where a vehicle 7.1 has an area map loaded onto it, or otherwise connected to it locally or through a data connection or otherwise, where that area map has geo-tagging or location or position meta data attached to certain or all objects in that onboard map, which may be 3D or 2D, and the vehicle 7.1 flies along its flight route 7.5 between various buildings 7.6 and uses its onboard cameras or other sensors to detect objects in the real world near to it where it is flying 7.2 that are in its area map, and recognize those objects, and determine which object in its onboard map that object is, and load the GPS location of that object from the GPS, location and or position information attached to it and this determine its own (the vehicle's) location. This information reduces positional variance immediately, and is also integrated, merged, or otherwise, with other position estimates to provide an estimate of the position of a vehicle with reduced positional variance, possibly in a Bayesian manner.

FIG. 7B Shows a representation of a measurement of positional variance of a flight vehicle over time, while it flies along its flight route 7.5 between buildings 7.6 in a GPS degraded or denied area, where it employs a method of the present invention, by detecting objects that it recognizes 7.2 as in its onboard area map, where the position variance is shown to increase over time 7.7 using standard methods, but using a method of the present invention, positional variance is decreased 7.4 significantly, and approximately zeroed out, through such a visual spot check.

In FIG. 7A and FIG. 7B, a method is shown where a drone reduces positional variance by detecting an object that is geo-tagged in the area map it has onboard 7.2 where it uses object detection to detect objects that are in the area map on board, and position itself relative to the detected object 7.2 and load the GPS coordinates of that object, including its detected distance to that object 7.2 as its GPS coordinates, both approximately zeroing positional variance through this visual spot check and also merging that information with positioning information from flight vehicle path integration, VO/SLAM, position estimates from another method of the present invention including detecting distance to path edges, or any of these, and thereby reducing positional variance. Specifically, if a flight vehicle has an internal digital, or otherwise, map of a flight area, and it has integrated its flight path to have an estimate for its current location, including its current location within the digital map of the flight area, and it if it detects an object using its cameras, and has that object in its internal digital or otherwise flight map, it can reduce variance around its position estimate by loading the GPS position of that object it has recognized as its current GPS location, noting that it adjusts that given its measured or detected distance from that recognized object. If the vehicle would expect to see that object, given its expected location on its internal flight area map based on flight path integration or any method, it is able to verify the position estimate made by integrating its flight path or another method, and significantly reduce positional variance 7.4 on FIG. 7B.

This may be accomplished using a Bayesian framework, where its estimate location may be described as E(Loc|Object Identification) at a high level, where "Loc" is the expected location from all other methods; using multiple methods of the present invention may entail E(Loc|Path Edges, IMU/INS)+E(Loc|Object Identification) where this reduction in positional variance is shown in chart 7.10 with label 7.8. Without the present invention, its position estimate would be described as E(Loc|Flight Path Integration, other classic methods), which has a higher variance 5.7, as shown in FIG. 5B, and even including other current methods, including visual odometry and or simultaneous localization area mapping, SLAM, or other loop closure methods, it would still have a higher position variance as shown in 7.7, but that positional variance decreases, as at 7.4 Multiple type of sensors, including distance measuring sensors as well as optical sensors may accomplish object recognition and determine which object in the real world has been detected from within the on board area map, and then uses those GPS coordinates tagged to that object or scene, to significantly reduce positional variance. Current methods as also called classical methods, may include IMUs, INSs, various gyroscopes or inertial measurement sensors, VO, SLAM, and or any combination of any of these or other current techniques.

Within the context of detecting an object 7.2 that is also in the area map, flight path 7.5 integration provides a Prior for current location probability estimation, detection of the recognized object informs, collapses, a posterior distribution for location or position estimate, in a case where a Bayesian framework may be used.

Figure 8:
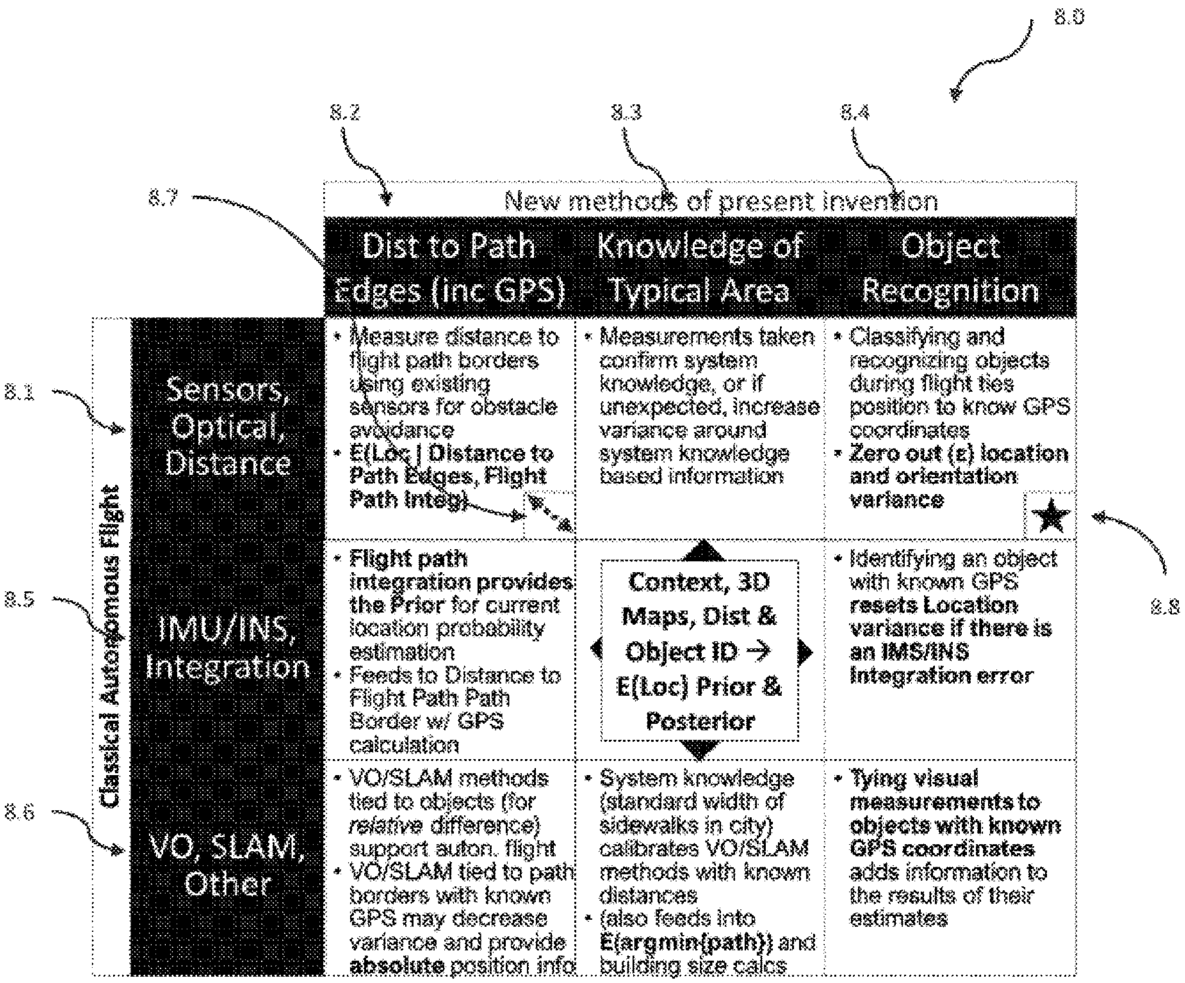
FIG. 8 presents a table that shows the intersection of functionality and value-add between methods of the proposed invention and current positing related methods.

FIG. 8 shows a schematic 8.0 that outlines how different existing autonomy capabilities combine with capabilities of the present method, with significant added value through new and novel techniques; the combination of the overlap between the methods is greater than the sum of the parts, the combination including joint, cross, and otherwise overlapping terms and capabilities helps flight, autonomous flight, and autonomy in communication degraded and GPS denied or degraded areas.

FIG. 8 Shows an intersection of functionality and value-add table, that shows how the methods of the proposed invention expand upon current techniques, and create significantly enhanced capabilities through their application in novel ways to advance the practice of the art of positioning and or GPS coordinate determination in GPS denied or degraded areas.

Specifically, Sensors, Optical, Distance 8.1 interact with Dist to Path Edges (inc GPS) 8.2 through: Measure distance to flight path borders using existing sensors for obstacle avoidance and E(Loc|Distance to Path Edges, Flight Path Integ), where this process 8.7 is also described in FIG. 6A and FIG. 6B as 6.2; furthermore, Sensors, Optical, Distance 8.1 interact with Knowledge of Typical Area 8.3 through: Measurements taken confirm system knowledge, or if unexpected, increase variance around system knowledge based information; and Sensors, Optical, Distance 8.1 interact with Object Recognition 8.4 through: Classifying and recognizing objects during flight ties position to know GPS coordinates and Zero out (g) location and orientation variance, where this process 8.8 is also described in FIG. 7A and FIG. 7B as 7.2.

Additionally, IMU/INS, Integration 8.5 interacts with Dist to Path Edges (inc GPS) 8.2 through: Flight path integration provides the Prior for current location probability estimation and Feeds to Distance to Flight Path Path Border w/ GPS calculation, and IMU/INS, Integration 8.5 interacts with Knowledge of Typical Area 8.3 through: Context, 3D Maps, Dist & Object ID yields and supports E(Loc) Prior & Posterior; with additionally IMU/INS, Integration 8.5 interacts with Object Recognition 8.4 through: Identifying an object with known GPS resets Location variance if there is an IMS/INS Integration error.

And VO, SLAM, Other 8.6 interacts with Dist to Path Edges (inc GPS) 8.2 through: VO/SLAM methods tied to objects (for relative difference) support autonomous flight and VO/SLAM tied to path borders with known GPS may decrease variance and provide absolute position info; where VO, SLAM, Other 8.6 interacts with Knowledge of Typical Area 8.3 through: System knowledge (standard width of sidewalks in city) calibrates VO/SLAM methods with known distances (also feeds into E(argmin{path}) and building size calcs; where also VO, SLAM, Other 8.6 interacts with Object Recognition 8.4 through: Tying visual measurements to objects with known GPS coordinates adds information to the results of their estimates.

Each of these interaction methods are non-exhaustive, and any combination of one or more of any of the interaction terms constitute ways in which the present invention significantly enhance capability for positioning without GPS.

Figure 9:
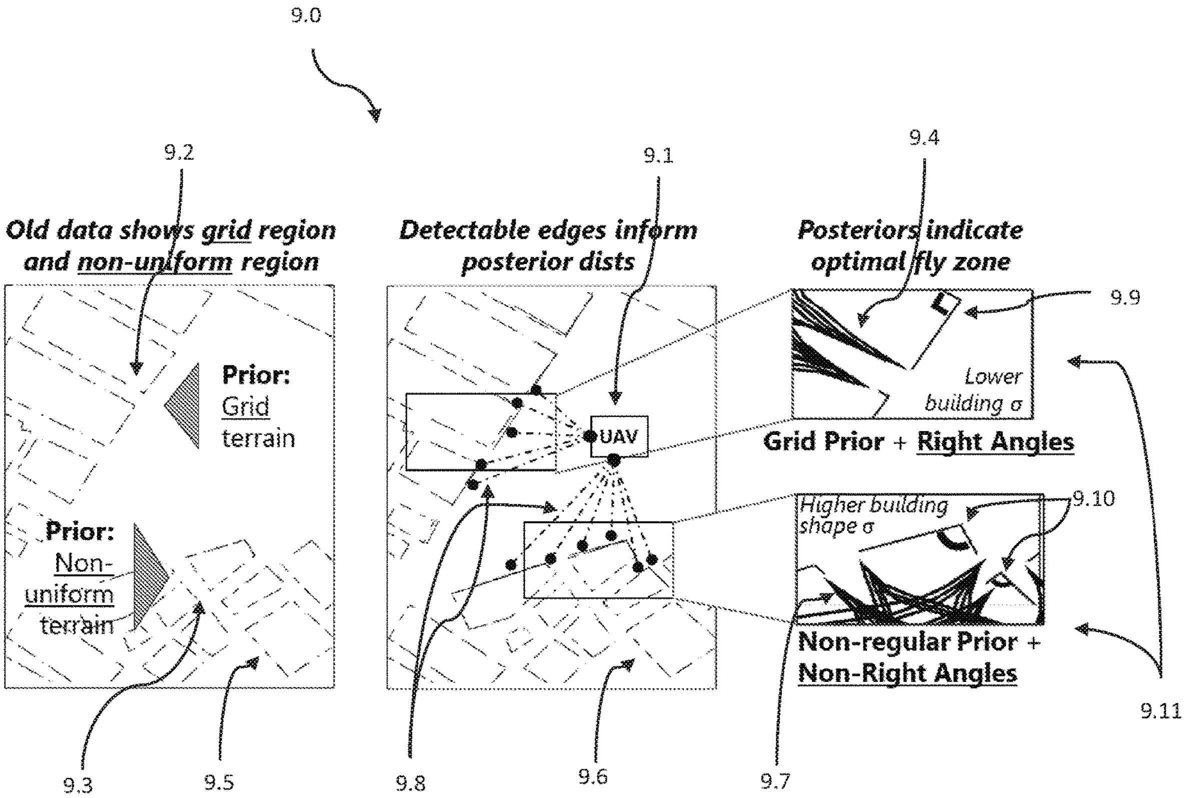
FIG. 9 shows an example of employment of the present invention used in determining expected boundary areas of obstacles, given contextual information about a city, landscape, area, but estimating shapes of obstacles with probability.

FIG. 9 shows an example of employment 9.0 of the present invention used in determining expected boundary areas of obstacles, given contextual information about a city, landscape, area, but estimating shapes of obstacles with probability. Furthermore, an embodiment of the present invention includes autonomous flight in GPS denied and degraded areas with minimal, sparse or no prior knowledge or area maps. An embodiment of the present invention included using system context to create prior and posterior distributions of obstacles of a flight area that may be without communication or GPS, including but not limited to probability distributions that help autonomous flight in GPS denied and degraded areas with partial 3D, 2D or otherwise and blank 3D, 2D, and otherwise, area maps. In the present method, contextual information informs Prior distributions for obstacle boundaries which enable path planning.

Specifically, using sparse information about an area, as in the dashed lines denoting old and semi reliable birds-eye-view photography of a city, where the dashed lines are the edges of buildings but the lines are dashed to denote it is from an old source, and is only partly trustable 9.5 can create a prior distribution about obstacles in that area, as in buildings 9.6, or other possible items, which informs flight path route planning, where for example, it may be safer to fly through areas of standard shape, square buildings, 9.2 than to fly through areas of irregular shaped buildings with non-square corners, 9.3.

Wherefore, knowing if an area is more likely have rectangular buildings can inform estimates about the building shapes, wall positions 9.4 and 9.7 and widths and lengths, therefore allowing an autonomous vehicle to better estimate a shortest path to a destination.

Furthermore, knowing context about an area can be used to estimate building wall locations different information leads to larger or smaller variance about locations of walls and or building shapes 9.11, like that an area has buildings that are generally more rectangular and standard shaped informs a prior distribution on the estimates for the shape and other edges of buildings 9.4 and 9.7, such that when a drone 9.1 measures some portions of its surroundings, including buildings 9.8, it uses those measurements, combined with the prior distributions of expected building shapes and sizes, to collapse that prior into a posterior distribution with lower variance around the expected locations of building walls 9.4 and 9.7, and can then make more informed decisions about lower risk flight routes.

In cases of less regular building shapes 9.3, a vehicle may use that to inform a prior distribution for shapes of a obstacles in a flight area, and then after taking measurements of an area, including corners of a building 9.9 and 9.10, a vehicle may determine that there is more variance to its estimates of building edges in one area 9.7 than another area 9.4 because the measurements about that small pieces of those areas, like irregular building corners 9.10 combined with an prior distribution indicating less uniform buildings 9.3, may indicate a higher risk flight area, where as more standard, right angles building corner measurements 9.9 combined with a prior distribution indicating more standard building shapes 9.2 may indicate a higher risk flight route area.

Furthermore, such methods of the prior distribution can be used to infer building widths and sized, to places shortest and fastest routes to a destination.

Furthermore, the example used shows one example of using initially, potentially spotty or degraded information about an area to inform a prior distribution on obstacles and safe flight routes in that area, where additional measurements taken by the drone other systems then may condense that prior into information with less variance about potential flight or operations areas, therefore enabling an autonomous system to better chose a route, or accomplish its mission.

Additionally, embodiments of the present invention may include object Recognition, IMU/INS, integration, identifying an object with known GPS resets Location variance if there is an IMS/INS integration error, object recognition with VO, SLAM, other methods, and then tying visual measurements to objects with known GPS coordinates adds information to the results of their estimates. Furthermore, distance to path edges may be used, including based on E(Position|IMU/INS, VO/SLAM), may use obstacle avoidance sensors to detect edges-of-flight-path with preloaded GPS data, including estimating E(Location|GPS Edges Flight Path, E(Locations|IMU/INS . . . )), furthermore while scanning flight areas, vehicles may identify known objects, load GPS coordinates of known object into E(Position), verify object doesn't appear to be moved/blown to a new location, possibly including IMU/INS integration, integration of speed and direction, rotation; adding this to known starting point, including but not limited to: E(Location|Flight Path Integration)+Location0. Where additional steps may include VO & SLAM position estimate, optically identifying points/object, record delta to object, Optically identify surroundings/features, record features and locations, record delta to constructed map, including but not limited to E(Location|Relative Movement to Localized Points)+Location0, and also including distance measurements to planned flight path borders, mid-size location error and variance reset, Given E(Location from ∫(IMU)), distance measurements indicate a specific location on known 3D area map, E(Location|Distance to Flight Path Edges with known GPS, Flight Path Integration). Also included in the present invention is object recognition, major location error and variance reset, object recognition within known 3D Area Map coordinates further defines exact position, including but not limited to: E(Location|Object Identification with known GPS Coordinates), and or E(Orientation|Object Identification with known GPS Coordinates).

All methods as described in positional variance relate to orientation, can additionally include orientation, and or only specifically include and or support orientation in some embodiments of the present invention.

In some instances, an initial location, location zero, may be used. Within the context of the present invention, the symbol ε may be construed to mean close to zero, or low, or small, especially relative to previous or surrounding sizes or values.

An example of employing the present invention as it relates to using information in 3D area maps to inform estimates or probabilistic estimates for planning flight in GPS degraded areas includes determining areas that may be low or high risk for autonomous flight, estimating the length of walls and or sizes of buildings using methods of the present invention, and or planning flight routes that are a shortest distance or best flight route.

Embodiments of the present invention also include enabling flight through unknown areas without GPS signal. Methods of the present invention expand upon current methods which often include live generation of flight area maps.

As an example of a process of flight in GPS denied and or degraded areas, with no area maps, 3D area maps and or zero or degraded or partial prior knowledge may include: setting initial conditions, where a known GPS of a starting point may be had, or an initial relative position may be used, which may be described as a zero point or base point and may be [0,0,0], a blank flight area map is loaded, anticipated destination GPS location is input into blank area map, or the anticipated destination such as k distance in 1 direction and q distance in r direction, where a high level framework for accomplishing the mission is move towards decreasing relative distance{[0,0,0], target [X,Y,Z]}||obstacle avoidance distance>p & argmin{time{E(Flight Path)}}, other parameters, that is, move in a direction such that the difference between the vehicle and the destination decreases, such that the distance the vehicle and obstacles stays above a minimum threshold, where other parameters are also included and or used, and a flight path is chosen based on estimating shapes of buildings using prior knowledge if present, image classification including types of building and characteristics of buildings as described in the present invention through calibrating parameters with known characteristics and or context of area if present, and SLAM methods and or other current live mapping methods, where probabilistic building/obstacle edge estimates enable flight path calculations, where system context may inform a prior distribution on expected building sizes and or shapes, and measurements taken may collapse and or inform a posterior distribution, including on building shapes and or sizes and or lengths of sides of buildings, and or other obstacles including cars, vehicles, power lines, mountains, rubbles, fences, and or any obstacle, non-exhaustive list.

Where some information that serves as an example of information that may be background information, and can serve to enable or support a prior distribution on elements in an area include is the city grid based which may decrease variance in obstacle shapes, specific objects at standard distances which may calibrate censors and obstacle shape, and or blast rubble or ill-defined edges increase the probability of non-visible building Edges, this is non-exhaustive; any information that may be obtained about an area prior to entering that may inform prior distributions on elements of that area fall within the present invention.

Where for example, old data shows grid region and non-uniform region, detectable edges that are uniform and right angles inform posterior distributions, and posteriors indicate optimal fly zones which may be more open, where as non-regular prior+non-right angles indicate areas that may not as good to fly through as they may be less open and non-navigable, including higher variance, denoted as σ within the present invention.

An additional example of employing the present invention as it related to using information in 3D area maps to inform estimates or probabilistic estimates for planning flight in GPS degraded areas may include where there is no prior information or some prior information, and may include steps that employ embodiments of methods of the present invention.

Where furthermore, for steps of a method of flight where there is a fuzzy or no 3D area map for example in a case of flight in an area with no 3D mapping, steps may include fly until it is determined that target is reached, subject to image recognition of target, Bluetooth or local beacon for distance measurement to target, signaling of target, possibly including flashing lights/non-optical signals, reflective paint in a certain pattern, other methods where a target and or target destination indicates itself.

Additionally, steps may include fly until a certain GPS position is reached, subject to if we know an example destination Bravo is at coordinates Cx,y and we have GPS at our starting point, but the area surrounding Bravo is GPS denied, then an optimal route cannot be determined if there is no information about the area such as a robust search method may be deployed, where a blank Area Map is loaded, minimization function is M=distance to target coordinates Cx,y may be created and or loaded and or uses, fly to minimize M, run distance sensors constantly, use SLAM, manufacture area map live, while flying, when distance measurement detects obstacle, and while running constantly, classify images detected by sensors, understanding of surroundings yields insights for machine to choose route, comprehension of “building” in front of vehicle indicates a rectangular corner of building to left or right of vehicle, analysis indicates probable shape of building, detect which side of building is closest and or shortest and or smallest, fly towards that side, continue to minimize M, while avoiding obstacles, while choosing shorter route around buildings. And while simultaneously area context may inform position estimate, standard distance between streetlights in sample flight area and or city informs total distance traveled (recognize street lights, count, multiply, other methods, including as described in the present invention), furthermore standard city block distance informs total distance traveled (recognize curbs, understand position on block and number of blocks traversed, other methods, including as described in the present invention), when a certain cloud of measurements in a direction indicate a building, combined with flight around a second side of a building, a probabilistic 3D Area Map is created, by inferring the other side of the building, where then a flight path may integrated in standard method, GPS and communication pings are tested periodically so a signal may get through and reset CO, known objects inform location "there is a blown out tank 200 m from our location" for example, and such, such that a vehicle may reach its target destination optimally through the present invention.

Furthermore, the present invention covers when GPS is denied, and there is no flight area map, fly above whole city, record distance data, combined with integrated flight out and return of UAV, these images yield or lead to rough distance map+rough distance of flight data to act as legend for distance map yield or lead to 3D maps or other maps, provide a great starting point.

E(item) is known as expected value of item, where in the present invention typically E(Location) or E(Position) or E(Coordinates) are used and represent an expected position, location and or coordinates and may be interchangeable.

Furthermore, an embodiment of the present invention includes loading a 3D area map with location information or system or context level information into or onto or connecting it with a vehicle, and a vehicle performs estimates of its location using on board sensors, and then based on that expected location, information as to its location in the 3D area map is loaded, thus informing its position and or decreasing the variance in its position. The expected location of a vehicle from in situ measurements may not be needed, it may simply recognize an object that appears in a 3D area map, and load that objects GPS information.

It may use standard information about a location, typical placement of street lights, sidewalk widths, etc., and use that information to calibrate, inform, or otherwise aid in location determination and estimates of flight routes and sizes, locations or otherwise of elements in area. Non-exhaustive info presented about the idea and method and algorithm presented.

Additionally, a method of the present invention uses context information to more precisely calibrate visual based navigation systems, including tagging objects in an area map with known sizes or other parameters, as well as not tagging specific images in an area map with parameters, but knowing those parameters for objects in an area, and allowing that information to help calibrate and more precisely use VO/SLAM, and other techniques including visual sensors, distance sensors, and other sensors.

For example, if a flight may occur in New York, a flight vehicle can be loaded with the information of the height of a standard New York street lamp, such that when flying autonomously, with or without GPS, a camera or other sensor may determine that a standard New York street lamp is nearby, and by comprehending or measuring the size of that street lamp, relative to the know size, its distance away can be determined. Likewise, if a vehicle is moving quickly, it can infer its speed by measuring the rate at which the street lamp changes height. And this can be used to infer absolute speed, not only relative speed. Likewise, the information about street lamps such as height, width, etc., may be tagged to each street lamp in a 3D area map or area map.

Additionally, in another example, the standard width of sidewalks in Hong Kong, or the standard size of windows in a certain type of building can be used in similar calibration techniques, of if certain types of buildings have certain shapes of windows, the route planning system can use that window shape to indicate an expected size or shape of a building, and use that to collapse a prior distribution based on some measured angles of the building, detectable to the flight vehicle from its location.

A method of the present invention may include an apparatus that is a computing and or sensing package, that includes embedded software and or artificial intelligence and or machine learning and or data systems and or storage, such that a hardware package of the present invention includes all required sensors to sense and detect a surrounding environment, and to store 3D area maps and or area maps and or 2D dimensional birds-eye maps with geo-tagged information, and to perform calculations to sense and comprehend a surrounding environment, and identify a vehicle's expected location within an area map or 3D area map, and load the geo-locations of objects from the area map that the vehicles has sensed or detected in its surroundings, and this accomplish a method of the present invention, including any and or all of methods of the present invention. Power may come from such an apparatus or it may receive power from a vehicle. Such an apparatus includes relevant sensors, including cameras, lidar, distance measuring sensors, sonar, electromagnetic, acoustic, laser, pulsing, and or any sensors that enable the methodology of the present invention. Such an apparatus may inform position, and may adjust flight routes, and may plan flight routes, and may execute flight routes through outputting control updates to a vehicle.

Figure 10:
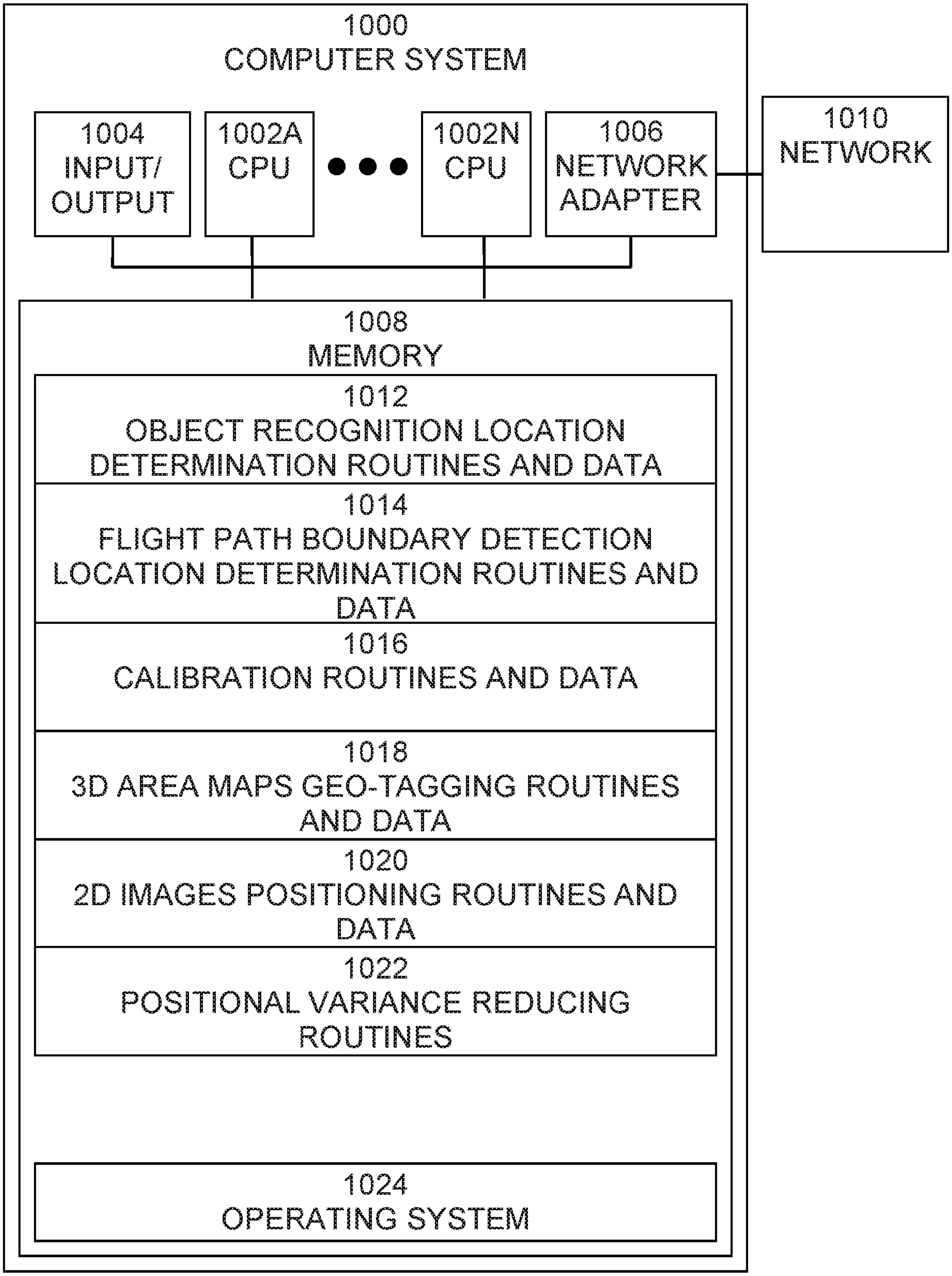
FIG. 10 shows an exemplary block diagram of a computer system 10000, in which processes involved in the embodiments described herein may be implemented

An exemplary block diagram of a computer system 1000, in which processes involved in the embodiments described herein may be implemented, is shown in FIG. 10. Computer system 1000 may be implemented using one or more programmed general-purpose computer systems, such as embedded processors, systems on a chip, personal computers, workstations, server systems, and minicomputers or mainframe computers, or in distributed, networked computing environments. Computer system 1000 may include one or more processors (CPUs) 1002A-1002N, input/output circuitry 1004, network adapter 1006, and memory 1008. CPUs 1002A-1002N execute program instructions in order to carry out the functions of the present communications systems and methods. Typically, CPUs 1002A-1002N are one or more microprocessors, such as an INTEL CORE® processor. FIG. 10 illustrates an embodiment in which computer system 1000 is implemented as a single multi-processor computer system, in which multiple processors 1002A-1002N share system resources, such as memory 1008, input/output circuitry 1004, and network adapter 1006. However, the present communications systems and methods also include embodiments in which computer system 1000 is implemented as a plurality of networked computer systems, which may be single-processor computer systems, multi-processor computer systems, or a mix thereof.

Input/output circuitry 1004 provides the capability to input data to, or output data from, computer system 1000. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1006 interfaces device 1000 with a network 1010. Network 1010 may be any public or proprietary LAN or WAN, including, but not limited to the Internet.

Memory 1008 stores program instructions that are executed by, and data that are used and processed by, CPU 1002 to perform the functions of computer system 1000. Memory 1008 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1008 may vary depending upon the function that computer system 1000 is programmed to perform. In the example shown in FIG. 10, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 10, memory 1008 may include object recognition location determination routines and data 1012, flight path boundary detection location determination routines and data 1014, calibration routines and data 1016, 3D area maps geo-tagging routines and data 1018, 2D images positioning routines and data 1020, positional variance reducing routines and data 1022, and operating system 1024. Object recognition location determination routines 1012 may include software routines and data for determining location using object recognition according to embodiments of the present systems and methods, as described above. Flight path boundary detection location determination routines and data 1014 may include software routines and data for determining location using flight path boundary detection according to embodiments of the present systems and methods, as described above. Calibration routines and data 1016 may include software routines and data for calibration of speed and positioning, using contextual information including street light heights, etc., according to embodiments of the present systems and methods, as described above. 3D area maps geo-tagging routines and data 1018 may include software routines and data for geo-tagging 3D area maps according to embodiments of the present systems and methods, as described above. 2D images positioning routines and data 1020 may include software routines and data for geo-tagging 2D images that have recognizable objects and positioning by examining current location to scan for database matches according to embodiments of the present systems and methods, as described above. Positional variance reducing routines and data 1022 may include software routines and data for reducing positional variance using visual systems layered onto flight path integration according to embodiments of the present systems and methods, as described above. Operating system routines 1024 may provide additional system functionality.

As shown in FIG. 10, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. §

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A system for navigating a drone, the system comprising:
- a server comprising a processor, memory accessible by the processor, program instructions and data stored in the server memory;
- wherein data stored in the memory comprises a geolocation dataset that comprises:
  - a map of a planned region of travel for the drone, the map including a planned travel path of the drone through the planned region of travel and predetermined measurements of expected distances of the drone to objects along the planned travel path; and
  - recorded images of real world locations within the planned region of travel, geo-locations of the real world locations in the recorded images, and geo-locations of the recorded images informing the geographical location from where the recorded images were captured;
- wherein the server is configured to estimate a geographical location of the drone by:
  - receiving a drone signal comprising image data captured by one or more image sensors of the drone;
  - matching the image data from the drone signal with one or more of the recorded images in the geolocation dataset;
  - estimating the geographical location of the drone based on the geo-locations of the real world locations in the one or more matched recorded images and an estimated distance of the drone from the geo-locations of the one or more matched recorded images; and
  - verifying, to reduce a variance of the estimated geographical location, by:
    - integrating the estimated geographical location of the drone with the planned travel path stored in the geolocation data to estimate a location of the drone along the planned travel path;
    - measuring a distance of the drone to one or more objects in a surrounding environment of the drone; and comparing the measured distance to the predetermined measurements of the expected distances in the geolocation dataset, wherein the system is configured to control a vehicle control system to navigate the drone based on the estimated geographical location.

2. The system of claim 1, wherein the geolocation dataset further comprises data representative of a 3D environment of the planned region of travel for the drone; and the server is further configured to compare the estimated geographical location of the drone with the data in the geolocation dataset that is representative of the 3D environment of the planned region of travel.

3. The system of claim 1, wherein the server is further configured, upon estimating the geographical location of the drone, to perform subsequent successive estimations of geographical location of the drone using the prior preceding estimated geographical location to reduce variance in the subsequent estimated geographical location.

4. The system of claim 1, wherein the geolocation dataset further comprises data representative of a 2D environment of the planned region of travel for the drone; and the server is further configured to compare the estimated geographical location of the drone with the data in the geolocation dataset that is representative of a 2D environment of the planned region of travel.

5. The system of claim 1, further comprising:

at least one drone comprising:

one or more sensors for receiving data;

a drone controller for controlling the drone; and one or more communications modules for sending and receiving signals, wherein the drone controller comprises a processor, memory accessible by the processor, and program instructions and data stored in the memory.

6. The system of claim 5, wherein the drone further comprises an image recognition and location module; and the drone controller is configured, when operating in a GPS degraded or denied environment, to execute a drone control algorithm stored in the drone memory for guiding the drone through use of the image recognition and location module.

7. The system of claim 1, wherein the server is further configured to estimate an enhanced geographical location of the drone by:

estimating an orientation of the drone relative to the one or more matched recorded images.

8. The system of claim 1, wherein the recorded images of the geolocation dataset are images previously captured along the planned travel path.

9. The system of claim 1, wherein the recorded images of the geolocation dataset are images previously captured from a satellite.

10. The system of claim 1, wherein the geolocation dataset further includes stored data on shapes of recorded objects, and the server is configured to detect the one or more objects, from data in the drone signal, using the stored shape data.

11. The system of claim 1, wherein the geolocation dataset further includes stored data on point clouds of recorded objects, and the server is configured to detect the one or more objects, from data in the drone signal, using the stored point cloud data.

12. The system of claim 1, wherein the geolocation dataset further includes one or more object features chosen from: object surface data, object edge data, object corner data, and object type.

13. The system of claim 1, wherein the server is further configured for updating the map in the geolocation dataset by:

detecting one or more unrecorded objects with data from the drone signal;

estimating a distance of the drone to the one or more unrecorded objects;

recording, to the map in the geolocation dataset, the one or more unrecorded objects, the estimated distance to the one or more unrecorded objects, and an estimated distance to the planned travel path.

14. The system of claim 1, wherein the objects along the planned travel path comprise ground features along the planned travel path, and the objects in the surrounding environment of the drone comprise ground features in the surrounding environment.

* * * * *